US010820343B2

(12) United States Patent
Ghosh et al.

(10) Patent No.: US 10,820,343 B2
(45) Date of Patent: Oct. 27, 2020

(54) RESOLVING ACKNOWLEDGEMENTS BETWEEN ASSOCIATED AND UNASSOCIATED STATIONS

(71) Applicant: Intel IP Corporation, Santa Clara, CA (US)

(72) Inventors: Chittabrata Ghosh, Fremont, CA (US); Laurent Cariou, Portland, OR (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/310,106

(22) PCT Filed: Jun. 29, 2017

(86) PCT No.: PCT/US2017/040069
§ 371 (c)(1),
(2) Date: Dec. 14, 2018

(87) PCT Pub. No.: WO2018/009413
PCT Pub. Date: Jan. 11, 2018

(65) Prior Publication Data
US 2019/0150189 A1 May 16, 2019

Related U.S. Application Data

(60) Provisional application No. 62/359,357, filed on Jul. 7, 2016.

(51) Int. Cl.
*H04W 4/00* (2018.01)
*H04W 74/00* (2009.01)
(Continued)

(52) U.S. Cl.
CPC ......... *H04W 74/008* (2013.01); *H04L 5/0053* (2013.01); *H04W 4/80* (2018.02);
(Continued)

(58) Field of Classification Search
USPC .................................................. 370/329, 338
See application file for complete search history.

(56) References Cited

U.S. PATENT DOCUMENTS 9,007,968 B2    4/2015  Singh et al.
2015/0078229 A1  3/2015  Choi et al.
(Continued)

FOREIGN PATENT DOCUMENTS

CN       109417816 A      3/2019
WO    WO-2016032258 A2    3/2016

OTHER PUBLICATIONS

"International Application Serial No. PCT/US2017/040069, International Search Report dated Oct. 30, 2017", 3 pgs.
(Continued)

*Primary Examiner* — Phuongchau Ba Nguyen
(74) *Attorney, Agent, or Firm* — Schwegman Lundberg & Woessner, P.A.

(57) ABSTRACT

Some embodiments relate to methods, computer readable media, and apparatus for resolving acknowledgements between associated and unassociated stations. An apparatus is disclosed including processing circuitry configured to decode responses to a random-access trigger frame, wherein one of the responses is a response from an unassociated station. The processing circuitry may be further configured to: encode an acknowledgement to acknowledge receipt of the response from the unassociated station, where the acknowledgement comprises an indication that the acknowledgement is for the unassociated station, and where the acknowledgement further comprises a media access control (MAC) address of the unassociated station in a field of the acknowledgement other than a field in a MAC header
(Continued)

portion of the acknowledgement. The processing circuitry may configure the HE access point to transmit the acknowledgement.

25 Claims, 13 Drawing Sheets

(51) Int. Cl.
```
H04W 4/80      (2018.01)
H04L 5/00      (2006.01)
H04W 72/04     (2009.01)
H04W 80/02     (2009.01)
H04W 88/10     (2009.01)
H04W 84/12     (2009.01)
H04W 88/08     (2009.01)
H04B 7/0452    (2017.01)
```
(52) U.S. Cl.
CPC ....... *H04W 72/0446* (2013.01); *H04W 80/02* (2013.01); *H04W 88/10* (2013.01); *H04B 7/0452* (2013.01); *H04L 5/0007* (2013.01); *H04W 84/12* (2013.01); *H04W 88/08* (2013.01)

(56) References Cited

U.S. PATENT DOCUMENTS

| | | | |
|---|---|---|---|
| 2016/0182205 A1 | 6/2016 | Asterjadhi et al. | |
| 2018/0288743 A1* | 10/2018 | Choi | H04L 27/2602 |
| 2020/0037356 A1* | 1/2020 | Lou | H04W 72/121 |

OTHER PUBLICATIONS

"International Application Serial No. PCT/US2017/040069, Written Opinion dated Oct. 30, 2017", 5 pgs.

Xiaofei, Tang, et al., "Follow Up for Multi-STA BA for SU Transmissions", In IEEE 8021116/O028r0 slides 125, (Jan. 18, 2016).

"Draft Standard for Information technology—Telecommunications and information exchange between systems Local and metropolitan area networks—Specific requirements? ? Part 11: Wireless LAN Medium Access Control ? (MAC) and Physical Layer (PHY) Specifications", Lan/Man Standards Committee ? Of the ? IEEE Computer Society: IEEE Draft; Draft P802.11AX DO.2, IEEE-SA, Piscataway, NJ USA vol. 802.11ax drafts, No. DO.2 (Jun. 8, 2016), XP068137424, Retrieved from the Internet: <www.ieee802.org/11/private/Draft_Standards/11ax/DraftP802.11ax_D0.2.pdf> on [retrieved on Jun. 8, 2016], (Jun. 8, 2016), 1-227.

"European Application Serial No. 17824728.4, Extended European Search Report dated Jan. 31, 2020", 5 pgs.

"International Application Serial No. PCT/US2017/040069, International Preliminary Report on Patentability dated Jan. 17, 2019", 6 pgs.

Kim, Jeongki, "Further consideration for Multi-STA Block ACK frame ; 11-15-0626-01-00ax-further-consideration-for-multi-sta-block-ack-frame", IEEE Draft; 11-15-0626-01-00ax-Further-Consideration-F Or-Multi-STA-Block-ACK-Frame, IEEE-SA Mentor, Piscataway, NJ USA, vol. 802.11ax, No. 1, (May 11, 2015), XP068094505, (May 11, 2015), 1-16.

* cited by examiner

```
                                            ┌─ 1300
                                            ▼

1302 ─── DECODE A RESPONSE TO A RANDOM-ACCESS TRIGGER FRAME,
         WHEREIN THE RESPONSE IS FROM AN UNASSOCIATED HE STATION

1304 ─── ENCODE AN MULTI-STATION BLOCK ACKNOWLEDGEMENT
         (BLOCKACK) FRAME TO ACKNOWLEDGE THE RESPONSE, WHEREIN
         THE MULTI-STATION BLOCKACK FRAME COMPRISES AN ASSOCIATION
         IDENTIFICATION (AID) FIELD WITH A UNIQUE IDENTIFICATION (UID)
         VALUE, AN ACKNOWLEDGMENT TYPE FIELD WITH A VALUE OF ZERO,
         AND A TRAFFIC INDICATION (TID) FIELD WITH A VALUE OF FIFTEEN,
         AND WHEREIN THE MULTI-STATION BLOCKACK FRAME COMPRISES A
         MEDIA ACCESS CONTROL (MAC) ADDRESS OF THE UNASSOCIATED HE
         STATION IN A BLOCK ACKNOWLEDGEMENT (BA) INFORMATION FIELD
         OF THE MULTI-STATION BLOCKACK FRAME

1306 ─── CONFIGURE THE HE AP TO TRANSMIT THE MULTI-STATION BLOCKACK
         FRAME
```

FIG. 13

RESOLVING ACKNOWLEDGEMENTS BETWEEN ASSOCIATED AND UNASSOCIATED STATIONS

PRIORITY CLAIM

This application is a U.S. National Stage Filing under 35 U.S.C. 371 from International Application No. PCT/US2017/040069, filed Jun. 29, 2017 and published in English as WO 2018/009413 on Jan. 11, 2018, which claims the benefit of priority to U.S. Provisional Patent Application Ser. No. 62/359,357 filed Jul. 7, 2016, each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for resolving acknowledgements between associated and unassociated stations. Some embodiments, relate to methods, computer readable media, and apparatus for resolving acknowledgements between associated and unassociated stations for uplink (UL) orthogonal frequency division multiple-access (OFDMA) based random access.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 13 illustrates a method for resolving acknowledgements between associated and unassociated stations in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
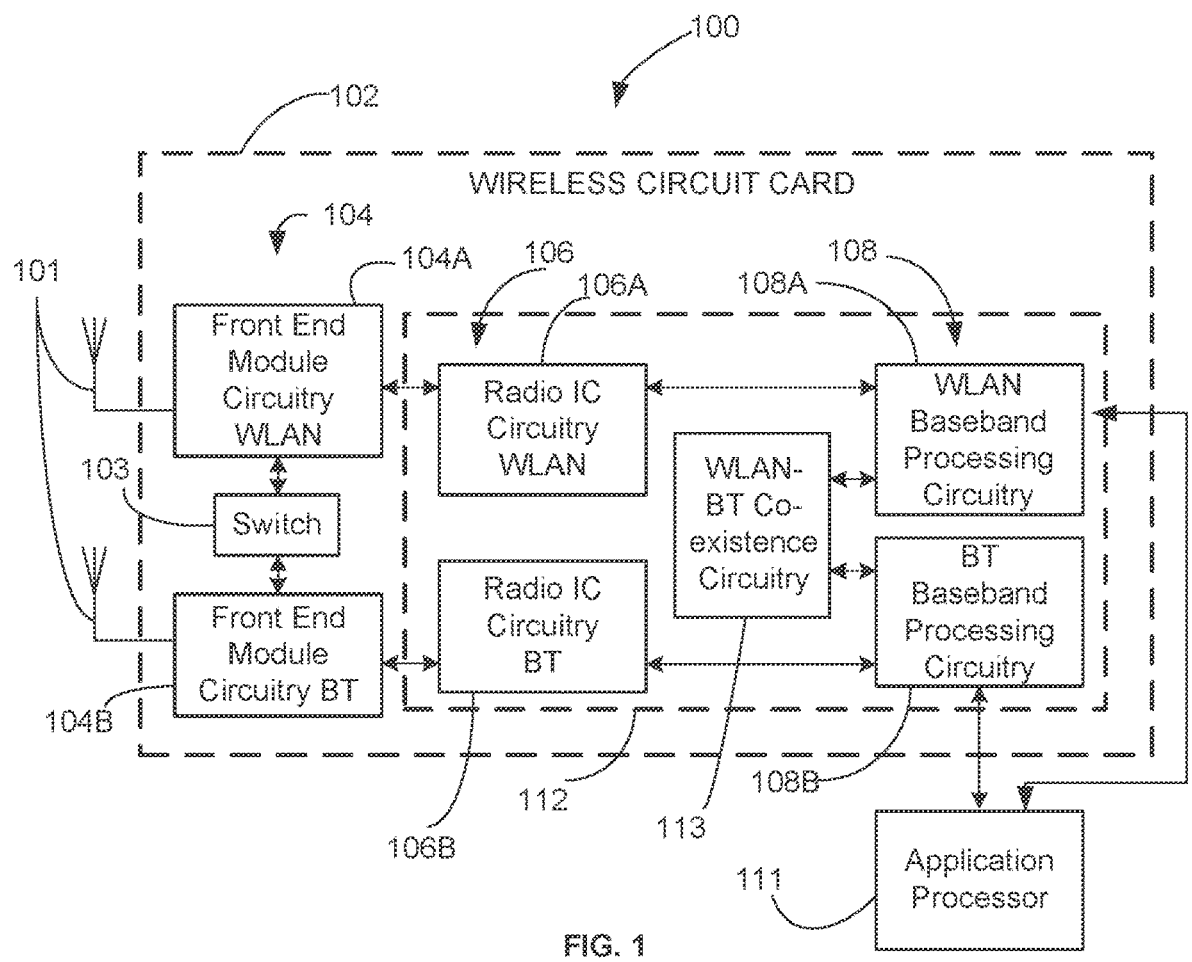
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or OFDMA communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016 IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
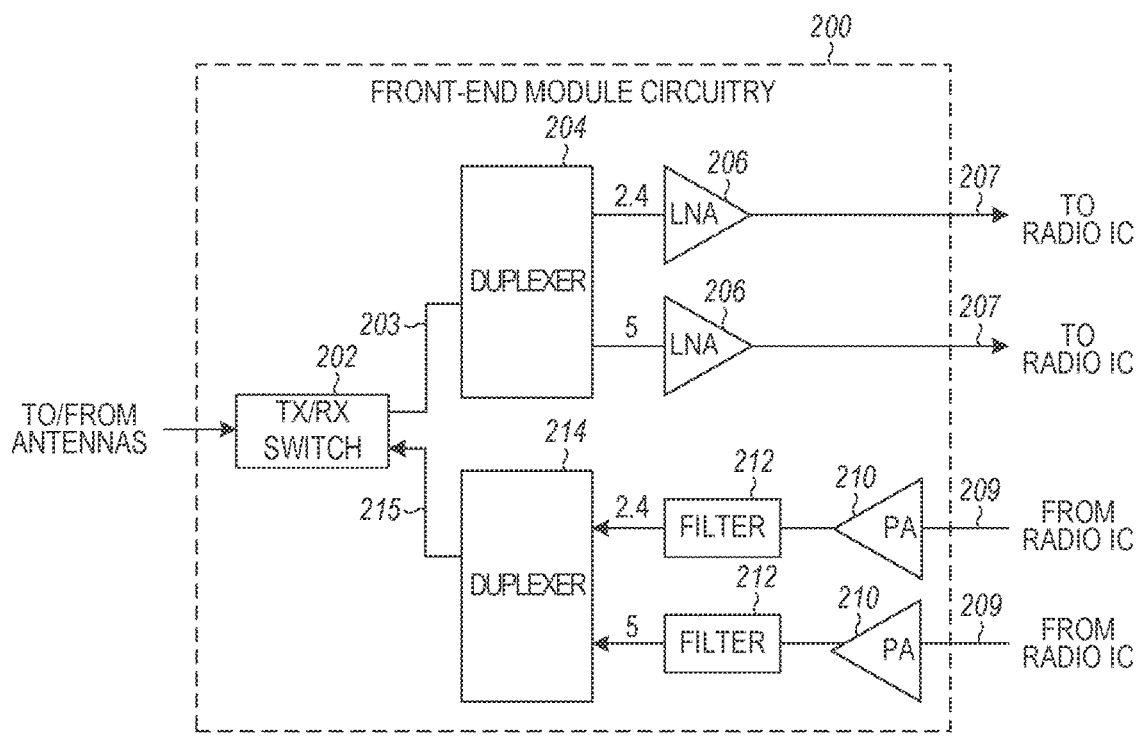
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of fibers, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
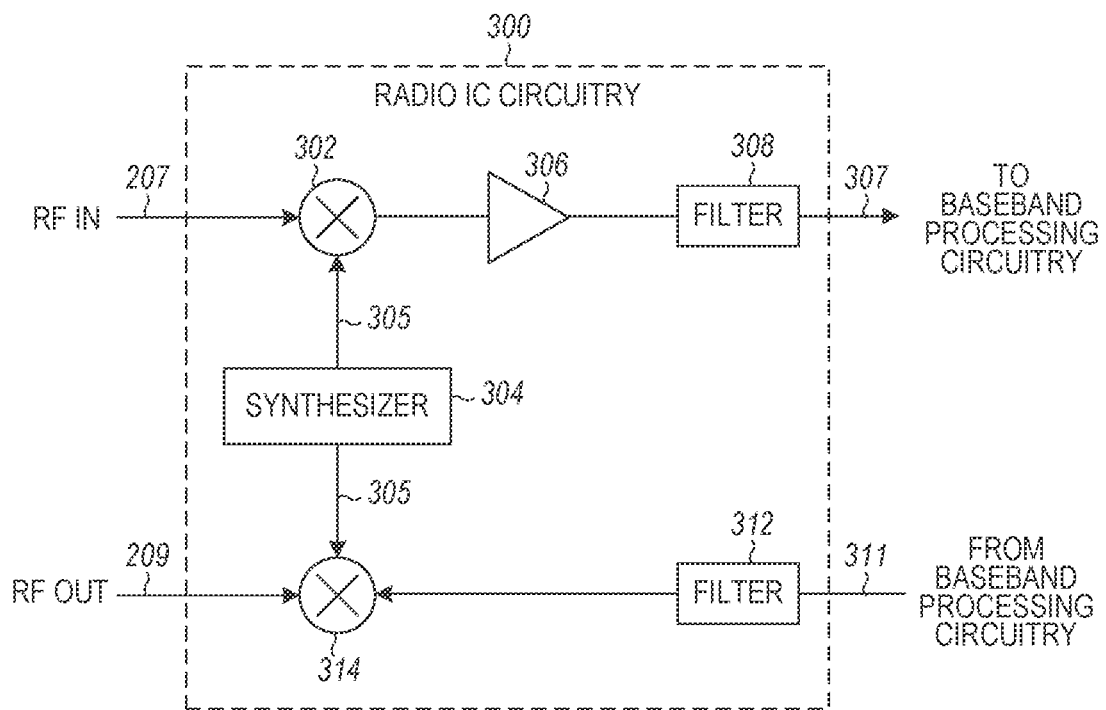
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-anode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
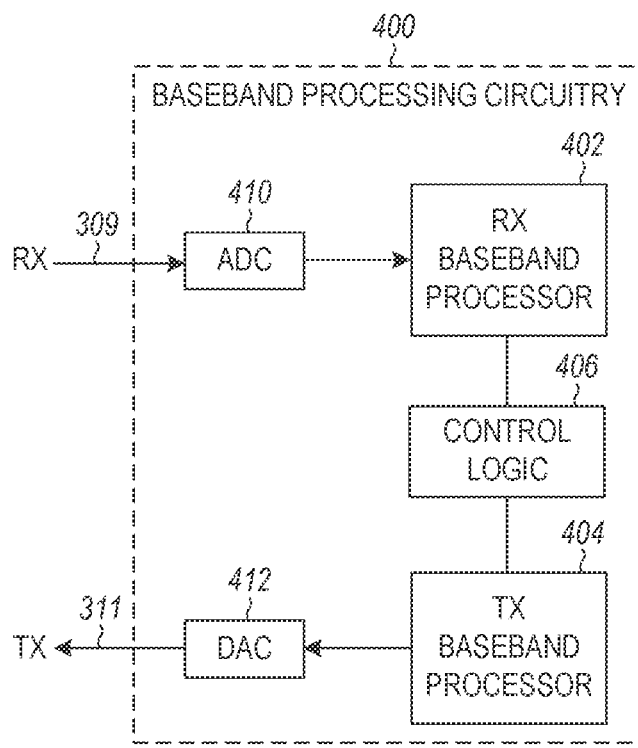
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
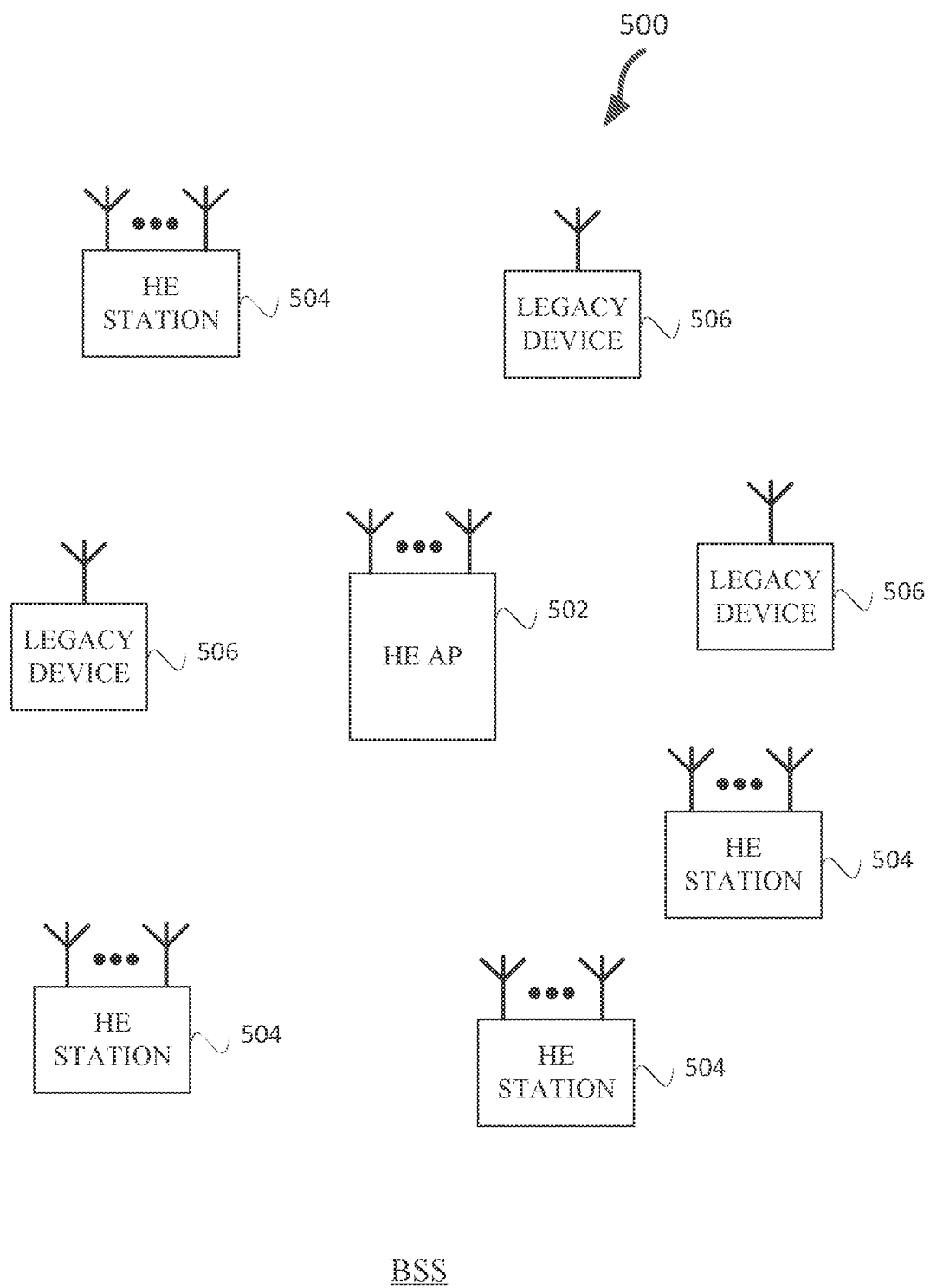
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using OFDMA, time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments, the bandwidth of the channels may be based on a number of active data subcarriers. In some embodiments, the bandwidth of the channels is based on 26, 52, 106, 242, 484, 996, or 2×996 active data subcarriers or tones that are spaced by 20 MHz. In some embodiments, the bandwidth of the channels is 256 tones spaced by 20 MHz. In some embodiments, the channels are multiple of 26 tones or a multiple of 20 MHz. In some embodiments, a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE KIERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an UL UL-MU-MIMO and/or UL OFDMA TXOP. In some embodiments, the trigger frame may include a DL UL-MU-MIMO and/or DL OFDMA with a schedule indicated in a preamble portion of trigger flame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments, the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuit of FIG. 2, the radio IC circuitry of FIG. 3, and/or the base-band processing circuitry of FIG. 4 may be configured to perform the methods and operations/functions herein described in conjunction with FIGS. 1-15.

In example embodiments, the HE station 504 and/or the HE AP 502 are configured to perform the methods and operations/functions described herein in conjunction with FIGS. 1-15. In example embodiments, an apparatus of the HE station 504 and/or an apparatus of the HE AP 502 are configured to perform the methods and functions described herein in conjunction with FIGS. 1-15. The term Wi-Fi may refer to one or more of the IEEE 802.11 communication standards. AP and STA may refer to HE access point 502 and/or HE station 504 as well as legacy devices 506.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments, HE STA 504 may be referred to as either a HE AP STA or a HE non-AP.

Figure 6:
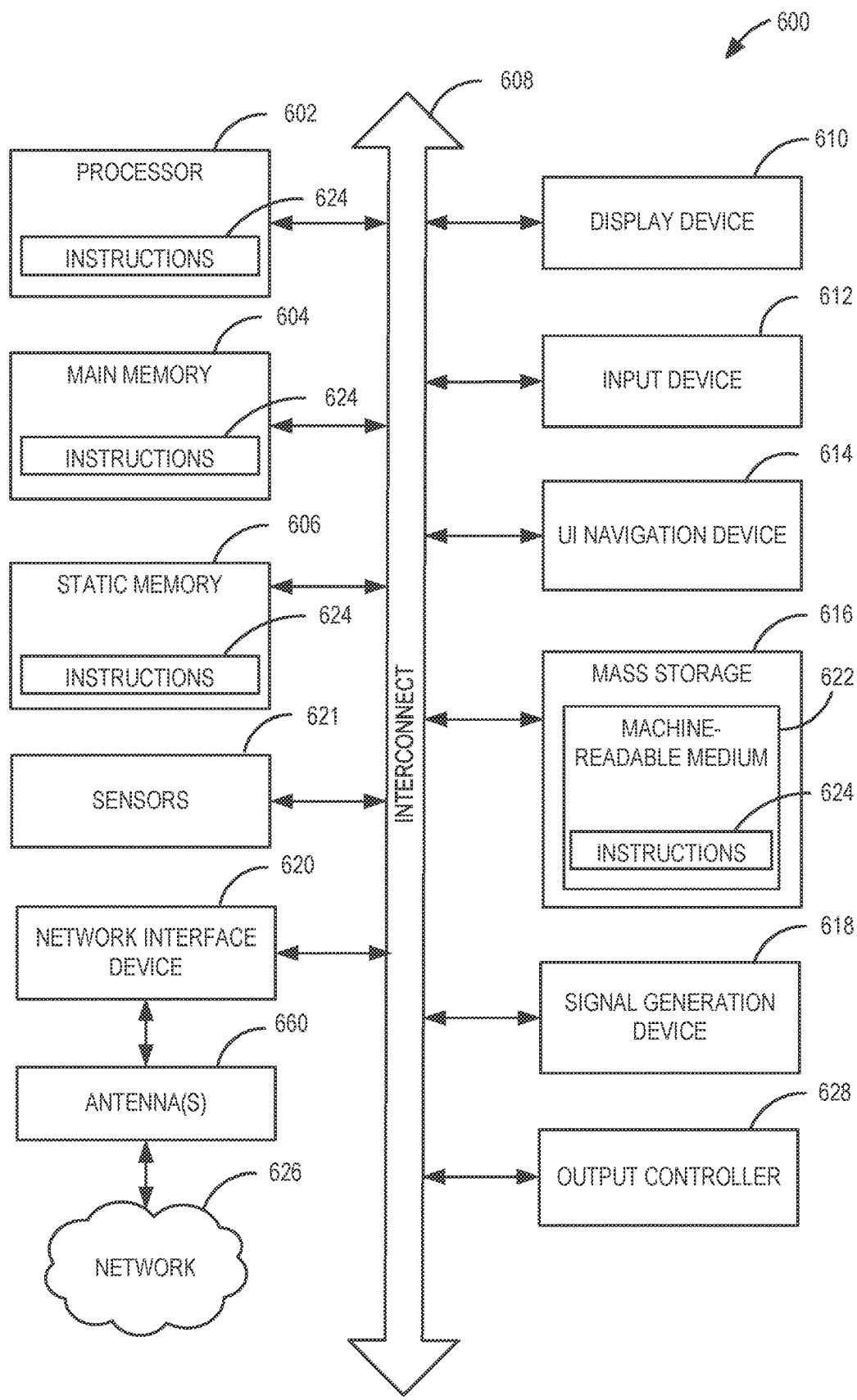
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or an combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.). In some embodiments, the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as hut not limited to read only memory (ROM); random access memory (RAM); magnetic disk storage media; optical storage media; flash memory, etc.

Figure 7:
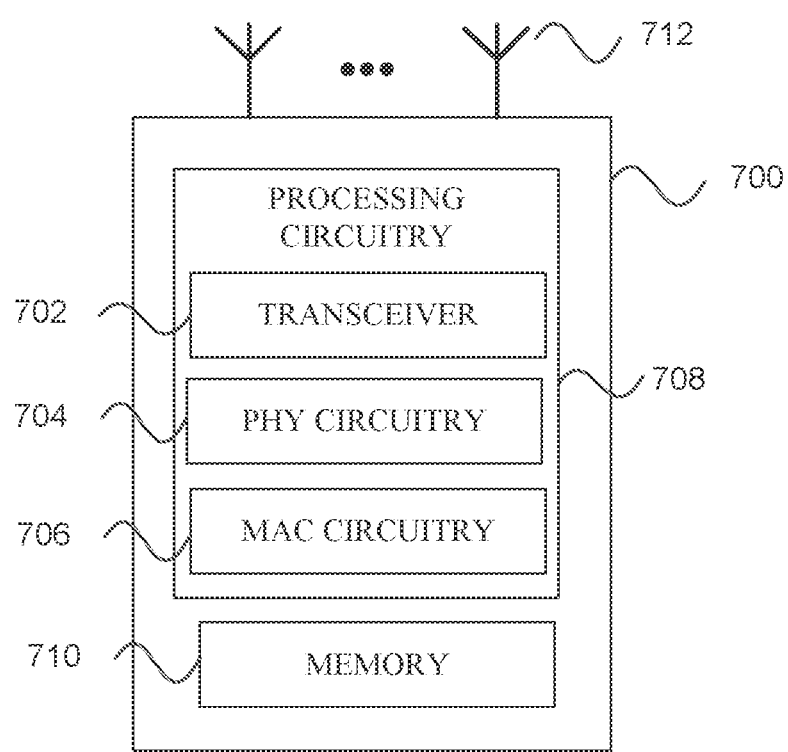
FIG. 7 illustrates a block diagram of an example wireless device upon which any one or more of the techniques methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be a HE STA 504 and/or HE AP 502 (e.g., FIG. 5). A HE STA 504 and/or HE AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs) radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
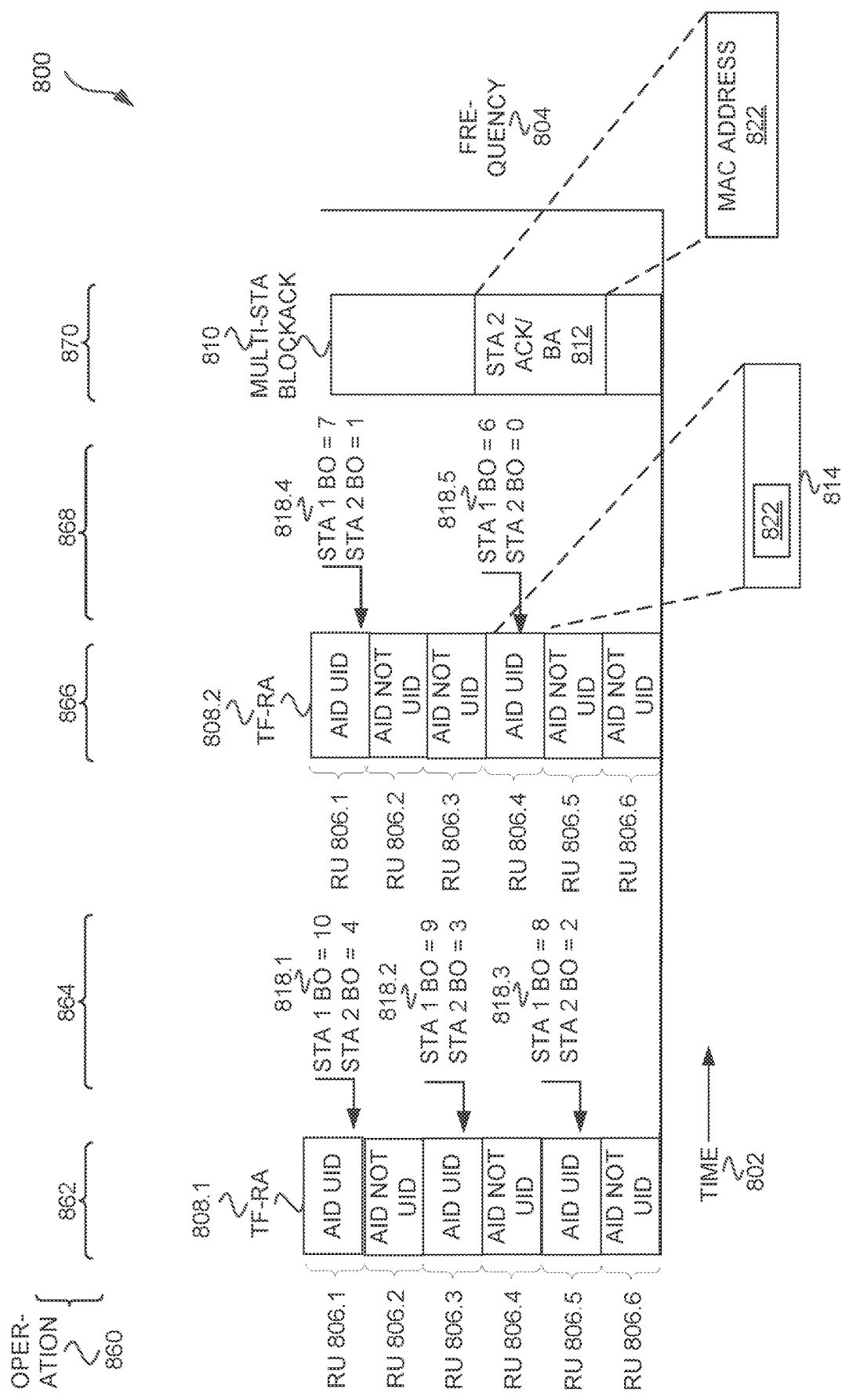
FIG. 8 illustrates a method of resolving acknowledgements between associated and unassociated stations in accordance with some embodiments.

FIG. 8 illustrates a method 800 of resolving acknowledgements between associated and unassociated stations in accordance with some embodiments. Illustrated in FIG. 8 is time 802 along a horizontal axis, frequency 804 along a vertical axis, and operations 860 along the top. The method 800 begins at operation 862 with a trigger frame for random access (RA) (IF-RA) 808.1 being transmitted by a HE AP 502 (see FIG. 5; not illustrated in FIG. 8). The TF-RA 808.1 includes RU fields 806 for HE stations 504 (see FIG. 5; not illustrated in FIG. 8). Some of the RU fields 806 have an association identification (AID) value of a unique identification (UID) (e.g., RU 806.3) which indicates that an unassociated HE stations 504 may attempt to use the RU indicated by the RU field 806. Some of the RU fields 806 have an AID value of AID not UID which indicates that unassociated HE stations 504 may not attempt to use the RU indicated by the RU 806 field. In some embodiments, the value of UID may be 2045. In some embodiments, a different value other than 2045 is used to indicate whether the RU 806 field indicates if the RU is for RA for unassociated HE stations 504 or for associated HE stations 504, from zero to two-thousand and forty-seven.

In some embodiments, the TF-RA 808 is either for unassociated station and/or associated stations. In some embodiments, the IF-RA 808 includes field that indicates whether the IF-RA 808 is for associated or unassociated stations. In some embodiments, the RUs 806 that are for RA (e.g., RU 806.1, 806.4) may be for either HE stations 504 that are associated with the HE AP 502 or for HE stations 504 that are not associated with the HE AP 502. The TF-RA 808 may include RU 806 that are assigned to associated stations (e.g, RU 806.2 may include a value of a AID of a HE station 504 to which the RU 806.2 is assigned) and RUs 806 that are for RA.

In some embodiments, STA 1 and/or STA 2 may be lower-power wireless devices than the HE AP 504 transmitting the TF-RA 808.1, 808.2. The STA 1 and/or STA 2 may be unable to transmit on a 20 MHz channel to the HE AP 504 with sufficient energy for the HE AP 504 to recognize the transmission and/or decode the transmission. STA 1 and/or STA 2 may be able to transmit packets on channels smaller than 20 MHz with sufficient energy for the HE AP 504 to decode the packets. In some embodiments, the method 800 provides the technical solution of enabling STA 1 and/or STA 2 to transmit to the HE AP 504 on channels with sufficient energy for the HE AP 502 to decode the packets.

The method 800 continues at operation 864 with STA1 and STA2 attempting to gain access to an RU. STA1 and STA2 may be HE stations 504. STA1 and STA2 are not associated with the HE AP 502 that transmitted the TF-RA 808. In some embodiments, STA1 or STA2 are associated with the HE AP 502 that transmitted the TF-RA 808 but may not be identified in an AID NOT UID. If STA1 and/or STA2 is associated with the HE AP 502, then STA1 and/or STA2 would first check to see if a RU 806 was allocated for the STA1 and/or STA2, and if there was no RU 806 allocated for the STA1 and/or STA2, then. STA1 and/or STA2 may attempt to access an RU 806 for RA.

STA1 and STA2 may be configured to decrement their backoff counter (BO) one for each time there is an RU for RA indicated by the value of the RU field 806, e.g., UID or 2045. In some embodiments, STA1 and STA2 may initiate BO to a random value between zero and a minimum OFDMA-based contention window for initial transmission. STA1 and STA2 may adjust the value of the BO based on whether an RU 806 can be accessed. At 818.1. STA1 decrements its BO from 11 to 10, and STA2 decrements it BO from 5 to 4. At 818.2, STA1 decrements its BO from 10 to 9, and STA2 decrements its BO from 4 to 3. At 818.3, STA1 decrements its BO from 9 to 8, and STA2 decrements its BO from 3 to 2. Since the BO of STA1 and STA2 did not reach 0, neither STA1 nor STA2 attempt to transmit.

In some embodiments, STA1 and STA2 access the RUs allocated for random access in a different way. In some embodiments, the BO is termed an OFDMA BO (OBO).

The method 800 continues at operation 866 with the HE access point 502 transmitting TF-RA 808.2. TF-RA 808.2 indicates two RUs (i.e., RU 806.1 and RU 806.4) that are available for RA for unassociated HE stations 504. The method 800 continues at operation 868 with STA1 and STA2 attempting to gain access to an RU. At 818.4, STA1 decrements its BO from 8 to 7, and STA2 decrements it BO from 2 to 1. At 818.5, STA1 decrements its BO from 7 to 6, and STA2 decrements its BO from 1 to 0.

STA2 determines to transmit on the RU indicated by RU 806.4 since its BO reached zero (0). STA2 transmits uplink (UL) frame 814 on the RU indicated by RU 806.4 field. In some embodiments, the TF-RA 808 includes other parameters that indicate how the UL frame 814 should be transmitted, e.g. a modulation and coding scheme (MCS) and duration. The UL frame 814 may be limited to a single PPDU, in accordance with some embodiments. The UL frame 814 may be a HE trigger-based (TB) PPDU in accordance with some embodiments. The UL frame 814 may be a medium access control (MAC) management protocol data unit (MMPDU). The UL frame 814 may be a HE TB PPDU that comprises a MMPDU. In some embodiments, the UL frame 814 may be a management frame with an RA field that permits the RA field to be the TA. In some embodiments, the frame 814 includes a MAC address 822 of STA2. In some embodiments, if STA2 is associated with the HE AP 502 that transmitted the TF-RA 808, then UL frame 814 may include a AID of STA2.

The method continues at operation 870 with the HE access point 504 transmitting a multi-STA BlockAck frame 810. In some embodiments, the HE access point 504 may transmit an ACK, BACK, or multi-BACK. In some embodiments, the multi-STA BlockAck frame 810 may be a multi-STA BlockAck 900 as described in conjunction with FIG. 9. In some embodiments, the multi-STA BlockAck frame 810 may be a multi-STA BlockAck 1000 as described in conjunction with FIG. 10.

The multi-STA BlockAck frame 810 includes a STA2 ACK/BA 812 portion that acknowledges frame 814. For example, the STA2 ACK/BA 812 may be a portion of BA information field 914. The multi-STA BlockAck frame 810 may include multiple acknowledgments for multiple stations (associated and unassociated) and/or multiple TIDs.

In some embodiments, the STA 2 ACK/BA 812 includes MAC address 822. The MAC address 822 may be as described in conjunction with FIG. 9, i.e. MAC address 940. The MAC address 822 may be as described in conjunction with FIG. 10, i.e., unassociated identification 1004. The MAC address 822 may be a MAC address of STA2. The HE access point 502 may determine the MAC address of STA2 from the frame 814. The HE access point 502 may include the MAC address of STA2 in field MAC address 940 of FIG. 9. STA2 may verify that STA2 ACK/BA 812 portion is for STA2 based on the MAC address 822 matching the MAC address of STA2.

In some embodiments, two or more HE stations 504 may transmit simultaneously on the same RU indicated by the RU 806 field (e.g., both reach a BO of 0 at the same time.) Without the MAC address 822 one or more of the HE stations 504 may mistake the STA2 ACK/BA 812 portion as an acknowledgment for their frame (e.g., frame 814) when their frame was not successfully received by the HE access point 502. Thus, some embodiments, provide the technical solution of unassociated stations being able to identify acknowledgements (e.g., STA2 ACK/BA 812 portion) from HE APs 502.

Figure 9:
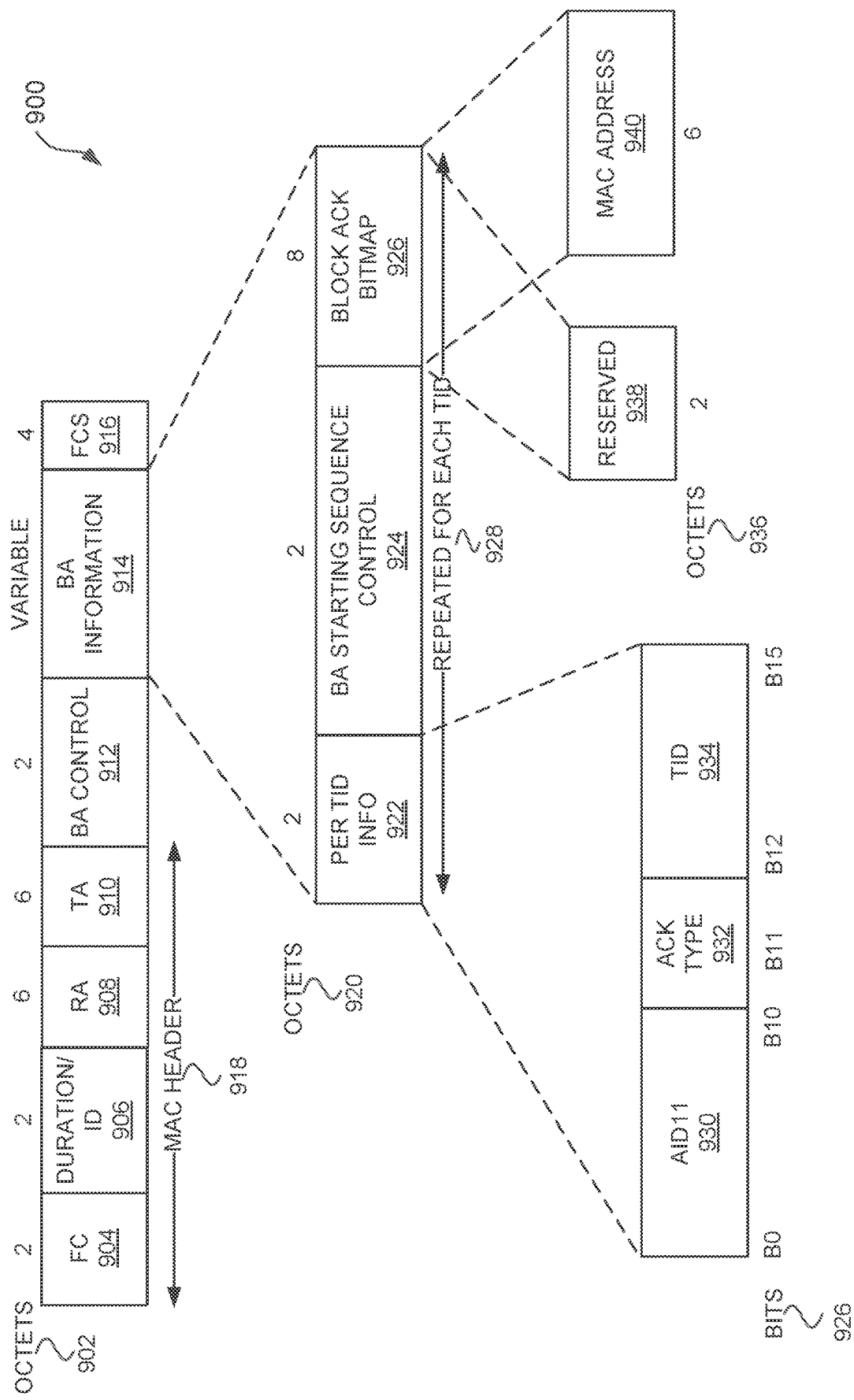
FIG. 9 illustrates a multi-STA block acknowledgement (ACK) (BlockAck) frame in accordance with some embodiments.

FIG. 9 illustrates a multi-STA block acknowledgement (ACK) (BlockAck) frame 900 in accordance with some embodiments. The multi-STA BlockAck frame 900 as illustrated) may be for acknowledging a frame from an unassociated HE station 504, e.g. STA1 or STA2 of FIG. 8. The multi-STA BlockAck frame 900 may include a frame control (FC) field 904, duration ID field 906, receiver address (RA) field 908, transmitter address (TA) field 908, BA control field 912, BA information field 914, and FCS field 916. The number of octets 902 is indicated above the fields. The FC field 904 may include information about the multi-STA BlockAck frame 900 such as protocol version, type and subtype fields that identify the type of frame, etc. The duration ID field 906 may indicate a duration for the multi-STA BlockAck frame 900. The RA field 908 may indicate a receiver address for the multi-STA BlockAck frame 900, which may be a broadcast address or multi-station address, in accordance with some embodiments. The TA field 910 indicates the address of the transmitter, which may be the HE access point 502. The FC field 904, duration/ID field 906, RA field 908, and TA field 910 may be part of a MAC header 918.

The BA control field 912 may include information related to the BA. For example, the BA control field 912 may include a BA ack policy field, a multi-TID field, a compressed bitmap field, a groupcast with retries (GCR) field, a reserved field, and a TID information field.

The FCS 916 may include information that enables error checking and correction. The BA information 914 may include per traffic identification (TID) information field 922, BA starting sequence control field 924, and block ACK bitmap field 926. The per TID information field 922, BA starting sequence control field 924, and block ACK bitmap field 926 may be repeated for each TID 928. The BA information field 914 may include information for multiple HE stations 504 and/or HE APs 502, and for each HE station 504 and/or HE AP 502 the fields per TID information field 922, BA starting sequence control field 924, and block ACK bitmap field 926 may be repeated for each TID 928.

The per TID information field 922 may include AID11 930, ACK type field 932, and TID field 934. The number of octets 920 is indicated above the fields. For an unassociated HE station 504, the AID11 field 930 may be set to a unique ID (UID) value. For example, the UID may be 2045 or another value representable by eleven bits, e.g. from zero to 2047. The ACK type field 932 may have one value for an ACK type (e.g., 0 or 1) and one value for a BA type (e.g., 0 or 1). The ACK type field 932 may be set to 0 for an unassociated HE station 504. The TID field may include a value for a TID. The TID field 934 may be set to 15, e.g., hits 1111, for an unassociated HE station 504.

The BA starting sequence control field 924 may indicates a BA starting sequence control 924. In some embodiments, the BA starting sequence control 924 is not used or not present when the per TID information field 922 and block ack bitmap field 926 indicate an acknowledgement for an unassociated HE station 504 and/or HE AP 502.

In some embodiments, the block ACK bitmap field 926 comprises a reserved field 938 and MAC address field 940. In some embodiments, the block ACK bitmap field 926 comprises a reserved field 938 and MAC address 940 when the AID11 field 930 has a value of the UID (e.g., 2045), the ACK type field 932 has a value of zero (0), and the TID field 934 has a value of fifteen (15 or bits 1111). The reserved field 938 may be a field reserved for future use. The MAC address field 940 has a value of the MAC address of the HE station 504 to which a frame is being acknowledged.

Figure 10:
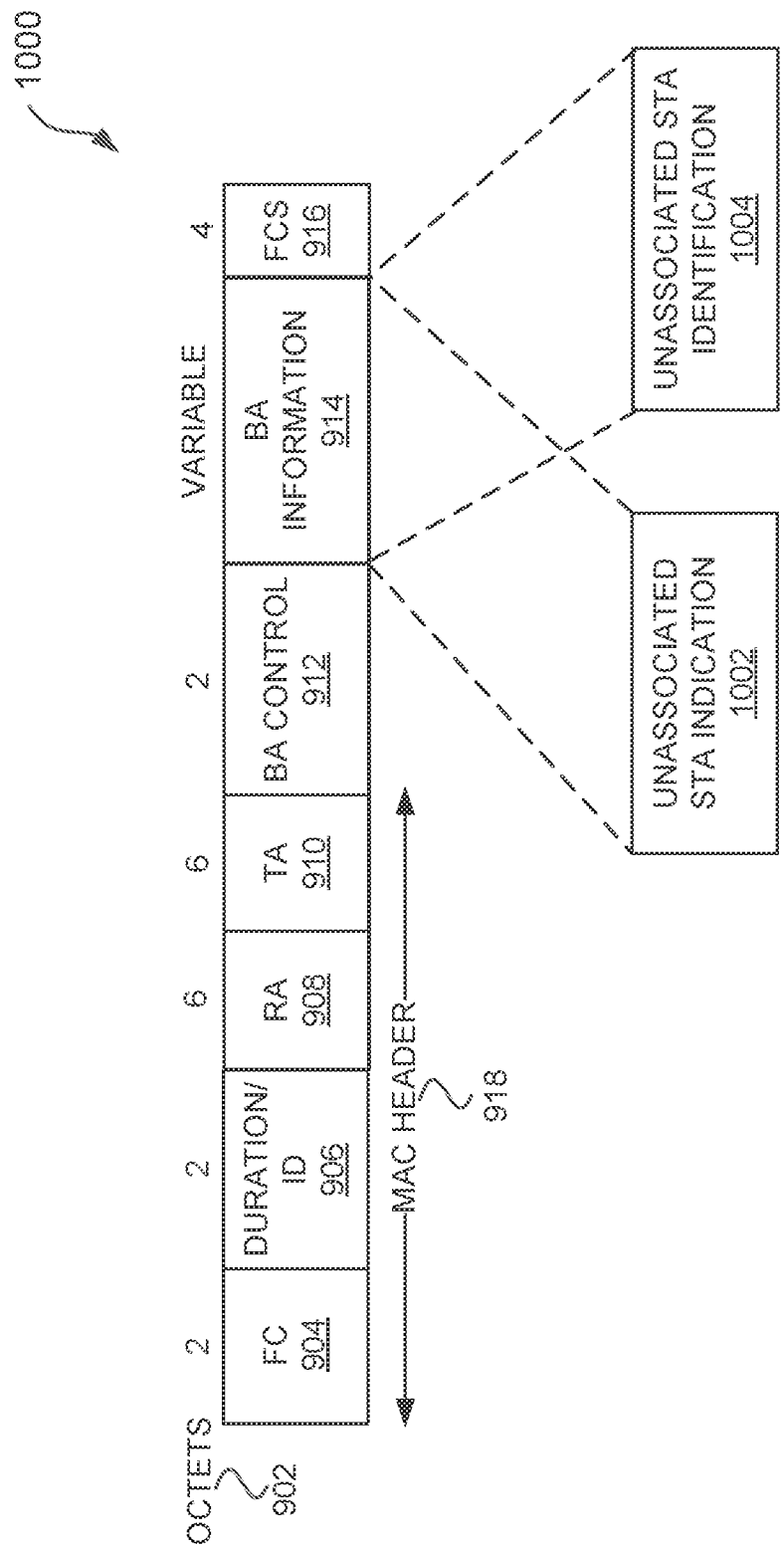
FIG. 10 illustrates a multi-STA BlockAck in accordance with some embodiments.

FIG. 10 illustrates a multi-STA BlockAck 1000 in accordance with some embodiments. The fields FC field 904, duration ID field 906, RA field 908, TA field 908, BA control field 912, BA information field 914, and FCS field 916 may be as described in conjunction with FIG. 9.

Figure 11:
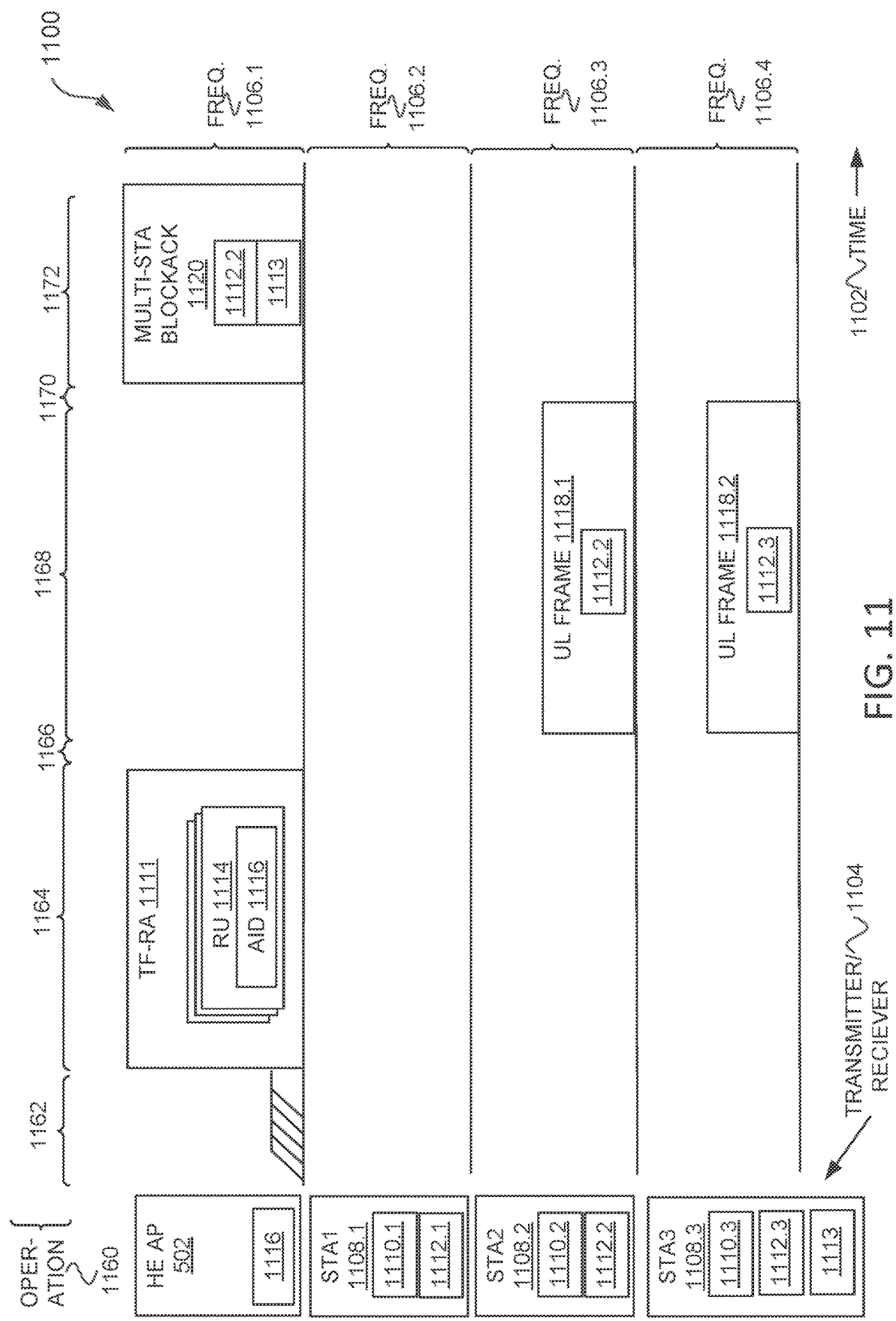
FIG. 11 illustrates a method of resolving acknowledgements between associated and unassociated stations in accordance with some embodiments.

FIG. 11 illustrates a method 1100 of resolving acknowledgements between associated and unassociated stations in accordance with some embodiments. FIGS. 10 and 11 will be described in conjunction with one another. Illustrated in FIG. 11 is time 1102 along a horizontal axis, transmitter/receiver 1104 along a vertical axis, frequency 1106 along a vertical axis, and operations 1160 along the top. STA1 1108.1 and STA2 1108.2 may be HE stations 504 or HE APs 502 that are not associated with the HE AP 502. STA1 1108.1 and STA2 1108.2 may include a BO 1110, which may be used to determine when the STA 1108 can access a RA RU. In some embodiments, BO 1110 is the BO as described in conjunction with FIG. 8. STA1 1108.1 and STA2 1108.2 may include a MAC address 1112.1, 1112.2, respectively. STA3 1108.3 may be a HE station 504 that is associated with the HE AP 502. STA3 1108.3 includes a MAC address 1112.3. STA3 1108.3 may include a AID 1113 and BO 1110.3.

Frequency 1106 may indicate a bandwidth that is transmitted and/or received on. The frequencies 1106 may overlap with one another. For example, frequency 1106.1 may be used by the HE AP 502 to transmit the TF-RA 1111 which may be the same frequency 1106 as frequency 1106.2 and/or frequency 1106.3. Frequencies 1106 may be 20 MHz, greater than 20 MHz, or less than 20 MHz, and may be equal to an RU indicated in the TF-RA 1111. The frequencies 1106 may overlap due to spatial streams, e.g., frequency 1106.2 and frequency 1106.3 may be the same frequency with different spatial streams. In some embodiments, the HE AP 502 includes association information 1116 that indicates which HE stations 1108 are associated with the HE AP 502. For example, association information 1116 may include a relationship (e.g., a database or table) between MAC addresses of HE stations 504, HE APs 502, and/or legacy stations 506 and AIDs assigned by the HE AP 502. For example, association information 1116 may include a relationship between the AID 1113 of STA3 1108.3 and the MAC address 1112.3 of STA3 1108.3.

The method 1100 begins at operation 1162 with the HE access point 502 gaining access to the wireless medium, e.g., the HE access point 502 may have performed a clear channel assessment (CCA).

The method 1100 continues at operation 1164 with the HE access point 502 transmitting a TF-RA 1111. The TF-RA 1111 may include RU fields 1114, which may include an AID field 1116. An AID field 1116 may indicate whether the RU (e.g., RU 806) indicated by the RU field 1114 is a RA RU for unassociated stations (e.g., HE stations). For example, the RU fields 1114 that have AID fields 1116 set to an UID may indicate that the RU indicated by the RU field 1114 is for RA by an unassociated station or associated station. The TF-RA 1111 may include a RU with the AID 1113 of STA3 1108.3 that indicates the RU is for STA3 1108.3, e.g., RU 806.2 (FIG. 8) may be an RU for STA3 1108.3. The TF-RA 1110 may be a TF-RA 808 as described in conjunction with FIG. 8, in accordance with some embodiments.

STA1 1108.1 and STA2 1108.2 may decode the TF-RA 1110 and determine based on a value of the BO 1110 and a number of the RUs indicated by the RU fields 1114 whether they can transmit, e.g., STA1 1108.1 and STA2 1108.2 may perform the method 800 as described in conjunction with FIG. 8. STA1 1108.1 may determine it cannot transmit because the BO 1110.1 did not reach zero. STA2 1108.2 may determine that it can transmit on a RU indicated by a RU field 1114 because the BO 1110.2 did reach zero. In some embodiments, there may be fewer or more unassociated stations (e.g., STA1 1108.1 and STA2 1108.2). In some embodiments, there may be fewer or more associated stations STA3 1108.3). STA3 1108.3 may decode the TF-RA 1110 and determined based on an AID of a RU 806 matching the AID 1113 of STA3 1108.3 that an RU 806 is for STA3 1108.3, e.g., RU 806.2.

The method 1100 continues at operation 1166 with STA2 1108.2 and STA3 1108.3 waiting a duration (e.g., short interframe space, SIFS) before transmitting. The method 1100 continues at operation 1168 with STA2 1108.2 transmitting UL frame 1118.1 in accordance with a RA RU indicated by a RU field 1114 selected based on the BO 11102. The UL frame 1118.1 may be a UL frame 814 as described in conjunction with FIG. 8. The UL frame 1118.1 includes the MAC address 1112.2 of STA2 1108.2. STA3 1108.3 may transmit in accordance with an RU 806 that has a value of an AID field that matches the AID 1113 of STA3 1108.3, e.g., RU 806.2. STA3 1108.3 may transmit a UL frame 1118.2 that may be a TB PPDU. In some embodiments, the UL frame 1118.2 does not include the MAC address 1112.3 of STA3 1108.3 when the RU used by STA3 1108.3 is an RU that has a value of an AID field that matches the AID 1113 of STA3 1108.3, e.g., RU 806.2.

In some embodiments, STA3 1108.3 may select an RU 806 to transmit UL frame 1118.2 in accordance with a RA RU indicated by a RU field 1114 selected based on the BO 1110.3.

The method 1100 continues at operation 1170 with HE access point 502 waiting a duration, SIFS, before transmitting. The HE access point 502 may identify the UL frame 1118 based on the MAC address 1108.3 of STA2 1108.2. The HE access point 502 may identify UL frame 1118.2 based on the RU, e.g., RU 806.2, which indicates a frequency 1106.4 and spatial stream. In some embodiments, if STA3 1108.3 used an RU for RA and STA3 1108.3 is associated with the HE AP 502, then the HE AP 502 may identify that the UL frame 1118.2 is from STA3 1108.3 based on the MAC address 1112.3 and association information 1116.

The method 1100 continues at operation 1172 with HE access point 502 transmitting multi-STA BlockAck frame 1120. The multi-STA BlockAck frame 1120 may be in accordance with the multi-STA BlockAck frame 900 of FIG. 9 or the multi-STA BlockAck frame 1000 of FIG. 10. The multi-STA BlockAck frame 1120 may include a portion of the BA information field 914 for each HE station 504 and/or HE AP 502 that is receiving an acknowledgment. Each associated HE station 504 (e.g., HE STA3 1108.3) and/or associated HE AP 502 may receive for each of the TIDs that the associated HE station 504 and/or associated HE AP 502 transmitted to the HE AP 502 a per TID information field 922, BA starting sequence control field 924, and block ack bitmap field 926. The multi-STA BlockAck frame 1120 may include a portion for each unassociated HE station 504 and/or unassociated HE AP 502 (e.g., as illustrated in FIG. 11 STAs 1108.) The multi-STA BlockAck frame 1120 may include an indication (e.g., unassociated STA indication 1002) that the portion of the multi-STA BlockAck frame 1120 is for an unassociated HE station 504 and/or unassociated HE AP 502. The multi-STA BlockAck frame 1120 may include for unassociated stations an unassociated STA identification 1004, which may be the MAC address of the unassociated station (e.g., MAC address field 1112.2 for STA2 1108.2). The multi-STA BlockAck frame 1120 may include for associated stations an AID 1113 for the STA3 1108.3 to determine that a BA information 914 portion is for STA3 1108.3.

In some embodiments, when the UL frame 1118 is a MMPDU, the multi-STA BlockAck frame 1120 may include a value of an ACK type field (e.g., 932 of FIG. 9) of zero, a value of a TID field (e.g., 934) of fifteen (all 1's), and a value of a block ACK bitmap field (e.g., 926) of a MAC address 1112.2 of the STA2 1108.2. The portion of the multi-STA BlockAck frame 1120 encoded as above may indicate an acknowledgment of a single MMPDU from the unassociated STA2 1108.2, in accordance with some embodiments.

In some embodiments, the unassociated STA indication 1002 may be a value of UID of the AID11 field 930, a value of an ACK type field 932 of zero, and a value of a TID field 934 of fifteen (all 1's). In some embodiments, the unassociated STA identification 1002 may be a MAC address of the unassociated station (e.g., MAC address 1112.2 of STA2 1108.2.) In some embodiments, the unassociated STA indication 1002 may be a value of the AID11 field 930, e.g., UID. In some embodiments, the unassociated STA indication 1002 may be a value of the AID11 field 930, e.g., UID, and a value of the ACK type field 932, zero. In some embodiments, the unassociated STA indication 1002 may be a value of the AID11 field 930, UID, and a value of the TID field 934, e.g., fifteen (all 1's). In some embodiments, the unassociated STA indication 1002 may be a value of the ACK type field 932, e.g., zero, and a value of the TID field 934, e.g., fifteen (all 1's). In some embodiments, the unassociated STA indication 1002 may be a value of the TID field 934, e.g., fifteen (all 1's) or another value. In some embodiments, the unassociated STA identification 1004 may be a MAC address of the unassociated station. In some embodiments, the unassociated STA identification 1004 may be a temporary AID of the unassociated STA.

In some embodiments, the multi-STA BlockAck frame 1120 includes a value of an ACK type field (e.g., 932 of FIG. 9) of zero, a value of a TID field (e.g., 934) of fifteen (all 1's), a value of an AID11 field (e.g., 930) of a UID (e.g., a value of 245), and a value of a block ACK bitmap field (e.g., 926) that includes a value of the MAC address 1112.2 of the STA2 1108.2. The multi-STA BlockAck frame 1120 encoded as above may indicate an acknowledgment of an UL frame 1118 from the unassociated STA2 1108.2, in accordance with some embodiments.

STA2 1108.2 may decode the multi-STA BlockAck 1120. STA2 1108.2 may determine that the multi-STA BlockAck 1120 includes a portion for an unassociated HE station 504 and/or an unassociated HE AP 502 based on the values of one or more fields of the multi-STA BlockAck 1120, e.g., based on unassociated STA indication 1002. The STA2 1108.2 may then determine if the portion of the multi-STA BlockAck 1120 is for the STA2 1108.2 based on whether the multi-STA BlockAck 1120 includes an unassociated STA identification 1004 that identifies STA2 1108.2, e.g., the block ACK bitmap field (e.g., 926) may include the MAC address 1112.2 of STA2 1108.2.

STA3 1108.3 may decode the multi-STA BlockAck 1120. STA3 1108.3 may determine that the multi-STA BlockAck 1120 includes a portion for the associated HE station 504 based on the AID 1113 of STA3 1108.3 being included in field of the BA information 914, e.g., an AID field 930. STA3 1108.3 may decode the BA starting sequence control 924 and block ack bitmap 926 to determine which packets have been acknowledged by the multi-STA BlockAck 1120.

In some embodiments, a value of AID11 field 930 of a UID indicates at least a portion of the multi-STA BlockAck frame 1120 is for a STA 1108 (e.g., unassociated HE station 504 and/or an unassociated HE AP 502). In some embodiments, a value of 15 (all 1's) of the TID field 934 indicates at least a portion of the multi-STA. BlockAck 1120 is for a STA 1108. In some embodiments, a value of one or more of the following fields is used to indicate that a portion of the multi-STA BlockAck 1120 is for a STA 1108: AID11 field 930, ACK type field 932, and/or TID field 934.

In some embodiments, when the multi-STA BlockAck 1120 indicates the multi-STA BlockAck 1120 is for a STA 1108, then a value of the block ack bitmap field 926 includes a MAC address (e.g., 1112) of the STA 1108 for which the acknowledgement is for.

In some embodiments, the multi-STA BlockAck 1120 is encoded as follows to indicate a portion of the BA information 914 is an acknowledgment of a UL frame 1118 from a STA 1108. A value of the AID11 field 930 is set to a UID (e.g., 245); a value of the ACK type field 932 is set to zero; a value of the TID field 934 is set to fifteen (all 1's); and, a value of a MAC address 940 is set to the MAC address 1112 of STA 1108. In some embodiments, the BA starting sequence control field 924 may be zero or not present if the per TID information field 922 and block ack bitmap field 926 are for an unassociated station (e.g., STA 1108).

In some embodiments, more than one unassociated HE station 504 and/or HE AP 502 may respond to the TF-RA 1110. In some embodiments, one or more associated HE stations 504 and/or HE APs 502 may respond to the TF-RA 1110 and one or more unassociated HE stations 504 and/or HE APs 502 may respond to the TF-RA 1110.

In some embodiments, if the TID field 934 has a value of fifteen (all 1's) with ack type field 932 with a value of zero (indicating an ACK), then the AID11 field 930 would be interpreted as a UID.

In some embodiments, if the TID field 934 has a value of any value but UID, and the ack type field 932 is set to zero (indicating ACK), then the AID11 field 930 is interpreted as an AID.

In some embodiments, if the TID field 934 has a value of fifteen (all 1's) with ack type field 932 set to zero (indicating ACK), then the block ack bitmap field 926 includes a six octet MAC of the unassociated station, the AID11 field 930 has a value of UID, and the BA starting sequence control 924 field is not present.

In some embodiments, if the TID field 934 has a value other than fifteen (all 1's) and ack type field 932 has a value of zero (indicating an ACK), then block ack bitmap field 926 is not included.

In some embodiments, a multi-STA BlockAck 900 encoded with the ack type field 932 with a value of 1, and the TID field 934 with a value of fifteen (all 1's) indicates that the AID11 field 930 is the UID and that the block ack bitmap field 926 includes the MAC address 940 of the unassociated station. The multi-STA BlockAck 900 encoded as above is an implicit ACK. This may simplify knowing the length of the BA information field 914 to only having to determine a value of the ack type field 932 and the size of the block ack bitmap 926. In some embodiments, the multi-STA BlockAck 900 and/or may be encoded as a single ACK for an unassociated station.

In some embodiments, the HE AP 502 is configured to send a multi-STA BlockAck 900 or 1000 for either unassociated station or associated stations. In some embodiments, the HE AP 502 is configured to send two multi-STA BlockAck 900 or 1000 if there are both associated and unassociated stations that need acknowledgements. In some embodiments, the multi-STA BlockAck 900 or 1000 include a field to indicate whether it is for unassociated stations or associated stations.

In some embodiments, when STA3 1108.3 is associated with the HE AP 502, STA3 1108.3 may send multiple packets to the HE AP 502 in operation 1168 when STA3 1108.3 is using a RU or a RA RU, e.g., UL frame 1118.2 may include multiple packets that can be acknowledged using the multi-station BlockAck 1120. In some embodiments, when STA2 1108.2 is not associated with the HE AP 502, STA2 1108.2 can only send one packet to the HE AP 502 because the multi-station. BlockAck 1120 may only have room to acknowledgment one packet for unassociated stations.

Figure 12:
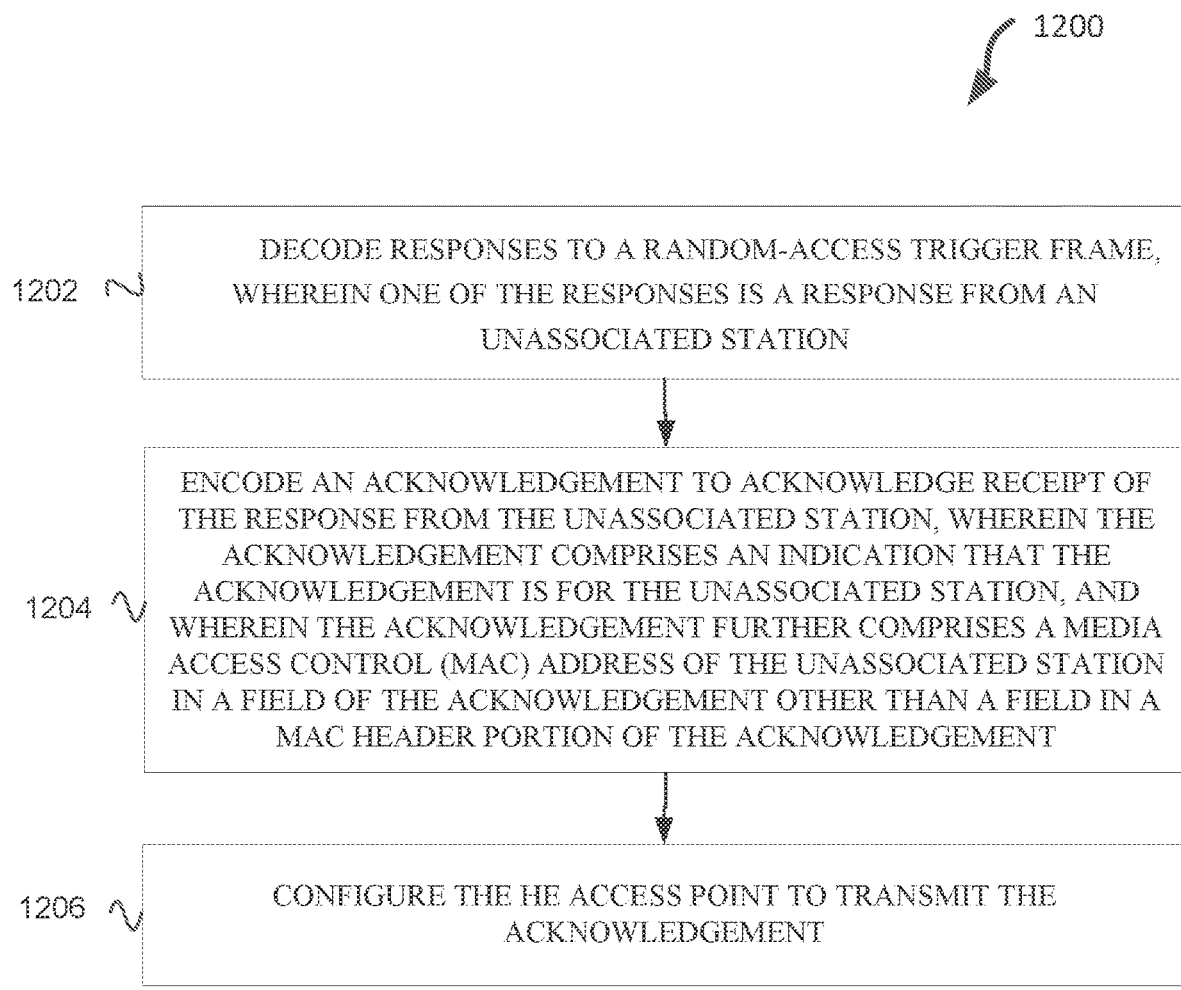
FIG. 12 illustrates a method for resolving acknowledgements between associated and unassociated stations in accordance with some embodiments.

FIG. 12 illustrates a method 1200 for resolving acknowledgements between associated and unassociated stations in accordance with some embodiments. The method 1200 begins at operation 1202 with decoding responses to a random-access trigger frame, where one of the responses is a response from an unassociated station. For example, a HE AP 502 may decode a UL frame 814 from STA 2, which is unassociated. The UL frame 814 may be in response to TF-RA 808. In another example, HE AP 502 may decode UL frame 1018 from STA2 1008, which is unassociated. UL frame 1018 may be in response to TF-RA 1111.

The method 1200 may continue at operation 1204 with encoding an acknowledgement to acknowledge receipt of the response from the unassociated station, where the acknowledgement comprises an indication that the acknowledgement is for the unassociated station, and wherein the acknowledgement further comprises a MAC address of the unassociated station in a field of the acknowledgement other than a field in a MAC header portion of the acknowledgement.

For example, a HE AP 502 may encode multi-STA BlockAck frame 810, which may include an unassociated STA indication 1002 that it is an acknowledgment for an unassociated station, and the MAC address 822 may be in block ack bitmap field 926, which is not part of the MAC header 918. The unassociated STA indication 1002 that indicates the acknowledgment is for an unassociated station may be that the ACK type field 932 is set to a value of zero, the TID field 934 is set to a value of fifteen, and the AID11 field 930 is set to a UID value. In some embodiments, the HE AP 502 may encode the unassociated STA indication 1002 as disclosed in conjunction with FIGS. 10 and 11.

In another example, HE AP 502 may encode multi-station BlockAck frame 1020 to include an unassociated STA indication 1002 with the MAC address 1012 (of the unassociated station) in a block ack bitmap field 926. In some embodiments, the HE AP 502 may encode the unassociated STA indication 1002 as disclosed in conjunction with FIGS. 10 and 11.

In some embodiments, a response may be from an associated station (e.g., an associated HE station 504 may respond on an RA RU of the trigger frame for random access). The method may optionally include encoding the acknowledgement to acknowledge the response from an associated station, where the acknowledgement comprises an AID of the associated station to indicate a portion of the acknowledgment that is for the associated station. For example, HE AP 502 may receive UL frame 1118.2 from STA3 1108.3 on a RA RU. The HE AP 502 may determine the AID of the associated STA3 1108.3 using association information 1116. The HE AP 502 may then encode a portion of multi-station BlockAck 1120 for STA3 1108.3 that is indicated by the AID 1113 of STA3 1108.3.

The method 1200 may continue at operation 1206 with configuring the access point to transmit the acknowledgement. For example, an apparatus of the HE AP 502 may configure the HE AP 502 to transmit the multi-STA Block- Ack frame 1120. As another example, an apparatus of an HE AP 502 may configure the HE AP 502 to transmit the multi-STA BlockAck frame 810.

In some embodiments, the method 1200 may be performed by a HE station 504, HE AP 502, an apparatus of a HE station 504, or an apparatus of a HE AP 502. In some embodiments, one more of the operations of method 1200 may be optional.

FIG. 13 illustrates a method 1300 for resolving acknowledgements between associated and unassociated stations in accordance with some embodiments. The method 1300 begins at operation 1302 with decoding a response to a random-access trigger frame, wherein the response is from an unassociated HE station.

For example, a HE AP 502 may decode a UL frame 814 from STA 2, which is unassociated. The UL frame 814 may be in response to TF-RA 808. In another example, HE AP 502 may decode UL frame 1018 from STA2 1008, which is an unassociated station. UL frame 1018 may be in response to TF-RA 1111.

The method 1300 may continue at operation 1304 with encoding an multi-station BlockAck frame to acknowledge the response, where the multi-station BlockAck frame comprises an AID field with a UID value, an acknowledgment type field with a value of zero, and a TID field with a value of fifteen, and wherein the multi-station BlockAck frame comprises a MAC address of the unassociated HE station in a BA information field of the multi-station BlockAck frame.

For example, a HE AP 502 may encode multi-STA BlockAck frame 810, which may comprise an AID field 930 with a UID value, an acknowledgment type field 932 with a value of zero, and a TID field 934 with a value of fifteen, and the multi-station BlockAck frame 810 may comprise a MAC address of the unassociated HE station 822 in a block ack bitmap field 926 of the multi-station BlockAck frame 900.

In another example, HE AP 502 (FIG. 11) may encode multi-STA BlockAck frame 1112, which may comprise an AID field 930 with a UID value, an acknowledgment type field 932 with a value of zero, and a TID field 934 with a value of fifteen, and wherein the multi-station BlockAck frame comprises a MAC address of the unassociated HE station 1112 in a block ack bitmap field 926 of the multi-station BlockAck frame 900.

The method 1300 may continue at operation 1306 with configuring the access point to transmit the multi-station BlockAck frame. For example, an apparatus of the HE AP 502 may configure the HE AP 502 to transmit the multi-STA BlockAck frame 1120. As another example, an apparatus of an HE AP 502 may configure the HE AP 502 to transmit the multi-STA BlockAck frame 810.

In some embodiments, the method 1300 may be performed by a HE station 504, HE AP 502, an apparatus of a HE station 504, or an apparatus of a HE AP 502. In some embodiments, one more of the operations of method 1300 may be optional.

Figure 14:
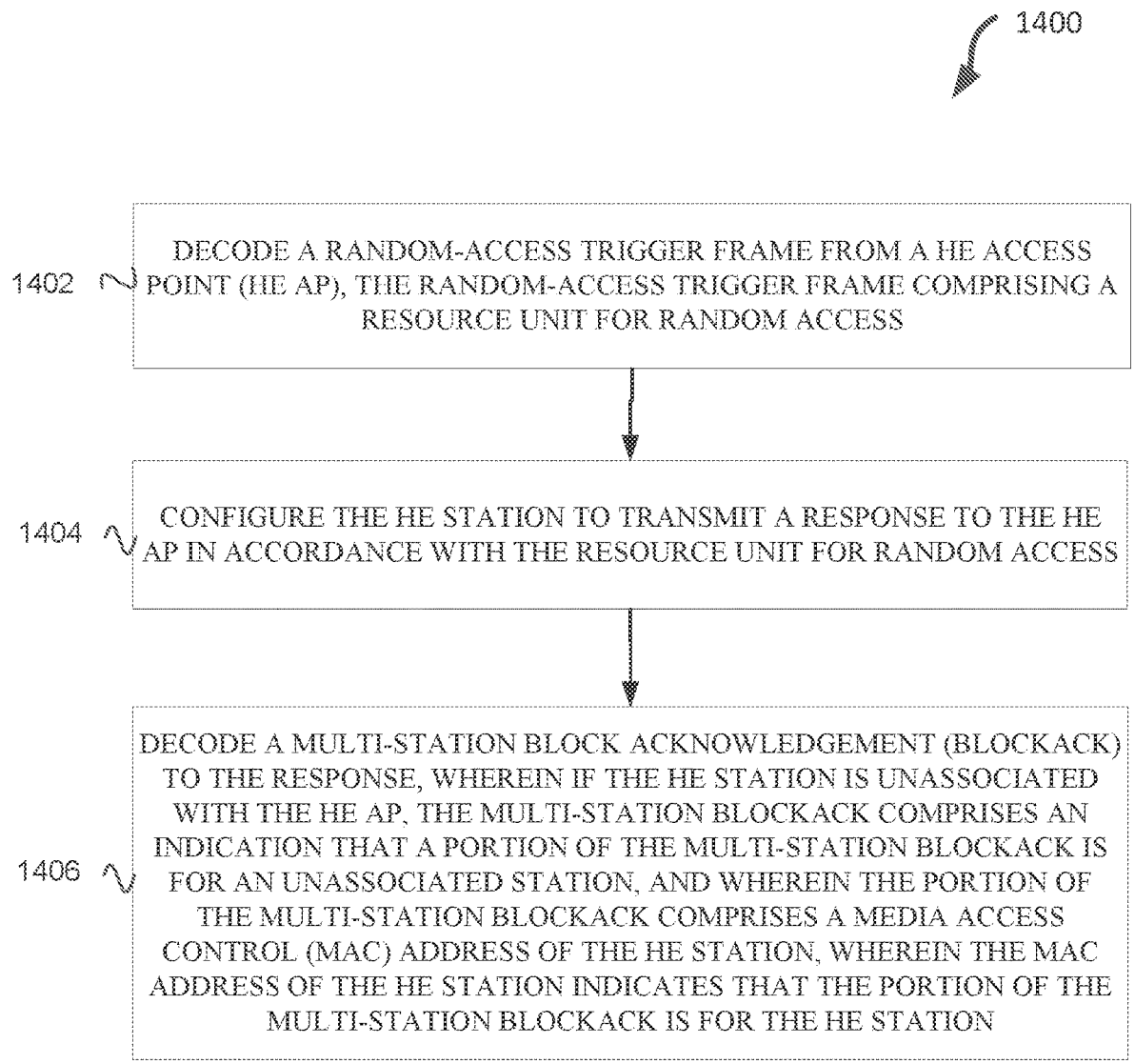
FIG. 14 illustrates a method for resolving acknowledgements between associated and unassociated stations in accordance with some embodiments.

FIG. 14 illustrates a method 1400 for resolving acknowledgements between associated and unassociated stations in accordance with some embodiments. The method 1400 begins at operation 1402 with decoding a random-access trigger frame from a HE AP, the random-access trigger frame including a resource unit for random access.

For example, STA2 1108.2 (or STA 2 of FIG. 8) may decode TF-RA 1111 from HE AP 502, or STA3 1108.3 may decode TF-RA 1111. STA2 1108.2 may be unassociated with HE AP 502 and STA3 1108.3 may be associated with HE AP 502. The TF-RA 1111 may include RUs 1114 which may include RU for RA (e.g., RU 806.1, 806.4).

The method 1400 may continue at operation 1404 with configuring the HE station to transmit a response to the HE AP in accordance with the resource unit for random access. For example, STA2 (FIG. 8) may encode UL frame 814 with a MAC address 822 of STA 2. In another example, STA2 1108.2 (FIG. 11) may encode UL frame 1118 with MAC address 1112.2 of STA2 1108.2 in response to TF-RA 1111. Additionally, an apparatus of STA2 (FIG. 8) may configure STA2 to transmit frame 814 on a RA RU. In another example, an apparatus of STA2 1108.2 may configure STA2 1108.2 to transmit UL frame 1118 on an RA RU indicated by RU 1114.

In another example, STA3 1108.3 may encode UL frame 1118.2 with MAC address 1112.3, and an apparatus of STA3 1108.3 may configure STA3 1108.3 to transmit UL frame 1118.2 on a RA RU indicated by RU 1114.

The method 1400 may continue at operation 1406 with decoding a multi-station BlockAck to the response, where if the HE station is unassociated with the HE AP, the multi-station BlockAck comprises an indication that a portion of the multi-station BlockAck is for an unassociated station, and where the portion of the multi-station BlockAck comprises a MAC address of the HE station, where the MAC address of the HE station indicates that the portion of the multi-station BlockAck is for the HE station.

For example, STA 2 (FIG. 8) may decode multi-STA BlockAck 810 that may include an unassociated STA indication 1002 and a MAC address 822 of STA 2. In another example, STA2 1108.2 may decode multi-STA BlockAck 1120 that may include an unassociated STA indication 1002 and a MAC address 1112.2 of STA2 1108.2. In some embodiments, the multi-STA BlockAck 810 or multi-STA BlockAck 1120 may include a value of the AID11 field 930 of UID, a value of the ACK type field 932 of zero, and a value of the TID field 934 of fifteen to indicate the multi-STA BlockAck 810 or 1120 is for an unassociated station. The UL frame may be a MMPDU. The block ack bitmap field 926 may include a reserved field 938 and a MAC address field 940 with a value of the MAC address of the unassociated station (e.g., an unassociated HE station 504.)

In some embodiments, the method 1400 includes decoding the multi-station BlockAck to the response, wherein if the HE station is associated with the HE AP, the portion of the multi-station BlockAck comprises an AID of the HE station, where the AID indicates that the portion of the multi-station BlockAck is for the HE station.

For example, STA3 1108.3 (FIG. 11) may decode multi-station BlockAck 1120, which may include a portion that is indicated by the AID 1113 of STA3 1108.3. The HE AP 502 may use association information 1116 to map the MAC address 1112.3 of STA3 1108.3 to the AID 1113 of STA3 1108.3. The AID11 930 field (FIG. 9) may include the AID 1113 to indicate that a portion of BA information 914 is for STA3 1108.3 to acknowledge the UL frame 1118.2.

In some embodiments, the method 1400 may be performed by a HE station 504, HE AP 502, an apparatus of a HE station 504, or an apparatus of a HE AP 502. In some embodiments, one more of the operations of method 1400 may be optional.

Figure 15:
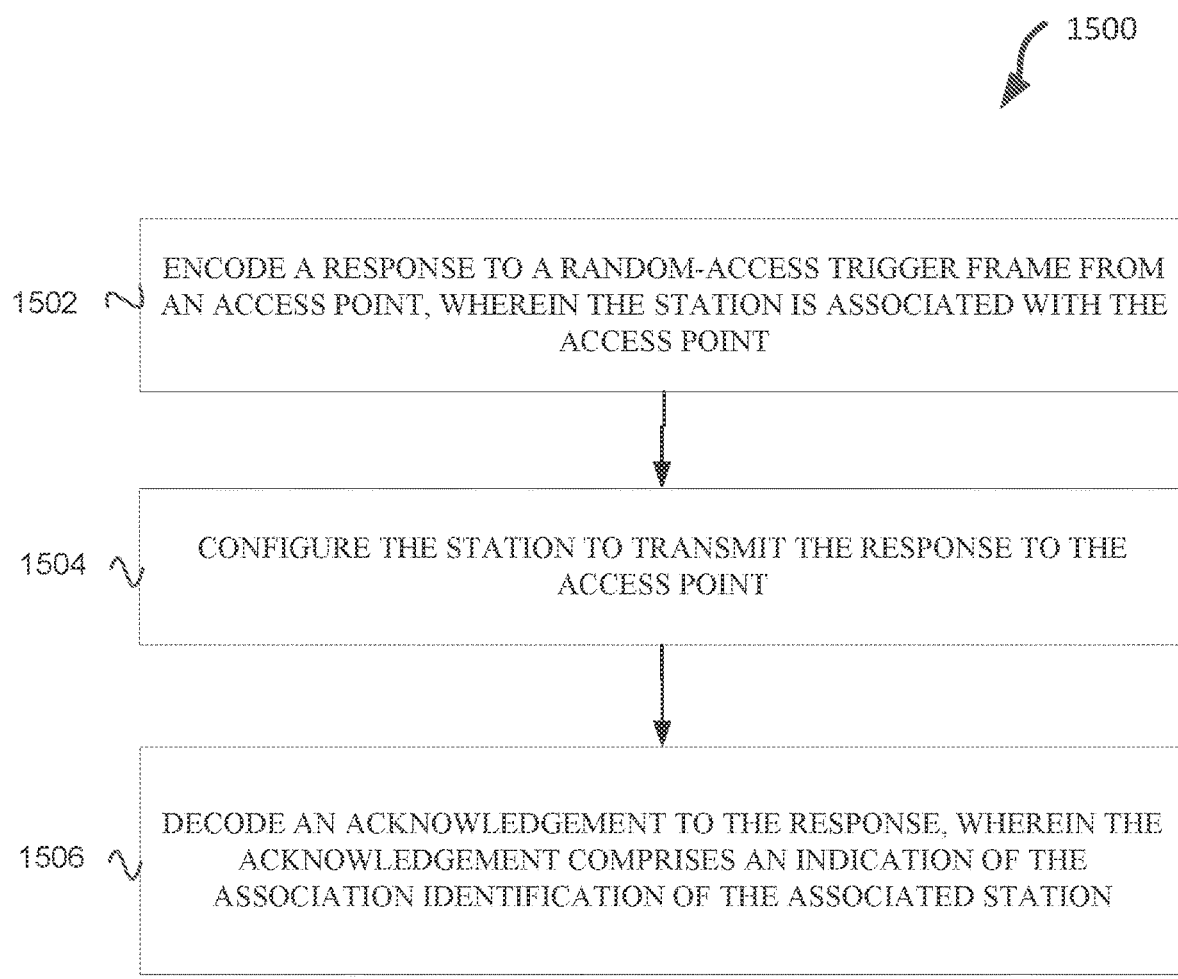
FIG. 15 illustrates a method 1500 for resolving acknowledgements between associated and unassociated stations in accordance with some embodiments.

FIG. 15 illustrates a method 1500 for resolving acknowledgements between associated and unassociated stations in accordance with some embodiments. The method 1500 begins at operation 1502 with encoding a response to a random-access trigger frame from an access point, wherein the station is associated with the access point.

For example, STA3 1108.3 (FIG. 11) may encode UL frame 1118.2 with a MAC address 1112.3 of STA3 1108.3.

STA3 1108.3 may determine a RU based on the method described in conjunction with FIG. 8. STA3 1108.3 may first determine that none of the RU 806 include an AID of STA3 1108.3, where the AID indicates that the RU 806 is assigned to STA3 1108.3. If STA3 1108.3 determines that it wants to transmit UL packets and there is no RU 806 assigned to STA3 1108.3 then it may access RU for RA as described in conjunction with FIG. 8.

The method 1500 may continue at operation 1504 with configuring the station to transmit the response to the access point. For example, an apparatus of STA3 1108.3 (FIG. 11) may configure STA3 1108.3 to transmit UL frame 1118.2.

The method 1500 may continue at operation 1506 with decoding an acknowledgement (or block acknowledgment) to the response, wherein the acknowledgement (or block acknowledgment) comprises an AID of associated station. The HE AP 502 may determine the AID 1113 of the HE station 1108.3 based on the MAC address 1112.3 and the association information 1116.

For example, STA3 1108.3 (FIG. 11) may decode multi-STA BlockAck 1120 that may include an AID 1113 of STA3 1108.3. The multi-STA BlockAck 1120 may include a portion for STA3 1108.3 that can be identified by the AID 1113 and which contains an acknowledgment or block acknowledgment of UL frame 1118.2.

In some embodiments, the method 1500 may be performed by a HE station 504, HE AP 502, an apparatus of a HE station 504, or an apparatus of a HE AP 502. In some embodiments, one more of the operations of method 1500 may be optional. Example embodiments provide a technical solution to the problem of addressing an unassociated station (e.g., with no AID) in an acknowledgment frame.

The following are example embodiments. Example 1 is an apparatus of a high-efficiency (HE) access point, the apparatus comprising memory; and processing circuitry coupled to the memory, the processing circuity configured to: decode responses to a random-access trigger frame, where one of the responses is a response from an unassociated station; encode an acknowledgement to acknowledge receipt of the response from the unassociated station, where the acknowledgement comprises an indication that the acknowledgement is for the unassociated station, and where the acknowledgement further comprises a media access control (MAC) address of the unassociated station in a field of the acknowledgement other than a field in a MAC header portion of the acknowledgement; and configure the HE access point to transmit the acknowledgement.

In Example 2, the subject matter of Example 1 optionally includes where the processing circuitry is further configured to: determine the MAC address of the unassociated station from a transmitter address field of the response from the unassociated station.

In Example 3, the subject matter of any one or more of Examples 1-2 optionally include where the indication comprises an association identification (AID) field with a unique identification (UID) value, an acknowledgment type field with a value of zero, and a traffic indication (TID) field with a predetermined value.

In Example 4, the subject matter of Example 3 optionally includes where the UID value is a number from zero to two-thousand and forty-seven.

In Example 5, the subject matter of any one or more of Examples 3-4 optionally include where the UID value is 2045.

In Example 6, the subject matter of any one or more of Examples 1-5 optionally include where the processing circuitry is further configured to: encode the random-access trigger frame to comprise indications of resource units for random access, where the unassociated station response is received on one of the resource units assigned for random access.

In Example 7, the subject matter of any one or more of Examples 1-6 optionally include where the response from the unassociated station is one from the following group: a MAC protocol data unit (MPDU), a management MPDU (MMPDU), an aggregated-MPDU (A-MPDU), physical (PHY) Layer Convergence Procedure (PLCP) (PPDU), a MAC service data unit (MSDU), and an aggregated MSDU (A-MSDU).

In Example 8, the subject matter of any one or more of Examples 1-7 optionally include where the acknowledgement is a multi-station block acknowledgement (BlockAck) frame, and where the indication that the acknowledgment is for the unassociated station and the MAC address of the unassociated station indicate that a portion of the multi-station BlockAck is for the unassociated HE station.

In Example 9, the subject matter of Example 8 optionally includes where a value of a BlockAck bitmap field of the multi-station BlockAck frame is encoded with the MAC address of the unassociated station.

In Example 10, the subject matter of any one or more of Examples 1-9 optionally include where the processing circuitry is further configured to: decode responses to the random-access trigger frame, where responses from lower-power stations are decoded on channel bandwidths that are less than 10 is missing parent: 20 MHz.

In Example 11, the subject matter of any one or more of Examples 1-10 optionally include access point.

In Example 12, the subject matter of any one or more of Examples 1-11 optionally include where one of the responses is a response from an associated station, and where the circuitry is further configured to: decode responses to the random-access trigger frame, where a second response is a response from an associated station; and encode the acknowledgement to acknowledge the response from the associated station, where the acknowledgement comprises an association identification (AID) of the associated station to indicate a portion of the acknowledgment that is for the associated station.

In Example 13, the subject matter of Example 12 optionally includes where the processing circuitry is further configured to: encode the random-access trigger frame to comprise indications of resource units for random access, where the associated station response is received on one of the resource units assigned for random access.

In Example 14, the subject matter of any one or more of Examples 12-13 optionally include where the processing circuitry is further configured to: determine the AID of the associated station from a MAC address of the second response from the associated station.

In Example 15, the subject matter of any one or more of Examples 1-14 optionally include transceiver circuitry coupled to the processing circuitry; and, one or more antennas coupled to the transceiver circuitry.

In Example 16, the subject matter of any one or more of Examples 1-15 optionally include where the memory is configured to store the random-access trigger frame and the acknowledgement.

Example 17 is a non-transitory computer-readable storage medium that stores instructions for execution by one or more processors, the instructions to configure the one or more processors to cause a high-efficiency (HE) access point (HE AP) to: decode responses to a random-access trigger frame, where one of the responses is an unassociated station response; encode an acknowledgement to acknowledge receipt of the unassociated station response, where the acknowledgement comprises an indication that the acknowledgement is for an unassociated station, and where the acknowledgement further comprises a media access control (MAC) address of the unassociated station in a field of the acknowledgement other than a field in a MAC header portion of the acknowledgement; and configure the HE AP to transmit the acknowledgement.

In Example 18, the subject matter of Example 17 optionally includes where the indication comprises an association identification (AID) field with a unique identification (UID) value, an acknowledgment type field with a value of zero, and a traffic indication (TID) field with a predetermined value.

In Example 19, the subject matter of Example 18 optionally includes where the UID value is 2045.

In Example 20 is a method performed by a high-efficiency (HE) access point, the method comprising: decoding responses to a random-access trigger frame, where one of the responses is a response from an unassociated station; encoding an acknowledgement to acknowledge receipt of the response from the unassociated station, where the acknowledgement comprises an indication that the acknowledgement is for the unassociated station, and where the acknowledgement further comprises a media access control (MAC) address of the unassociated station in a field of the acknowledgement other than a field in a MAC header portion of the acknowledgement; and configuring the HE access point to transmit the acknowledgement.

In Example 21, the subject matter of Example 20 optionally includes where the indication comprises an association identification (AID) field with a unique identification (UID) value, and the response from the unassociated station is a management MAC protocol data unit (MMPDU).

Example 22 is an apparatus of a high-efficiency (HE) station, the apparatus comprising memory; and processing circuitry coupled to the memory, the processing circuitry configured to: decode a random-access trigger frame from a HE access point (HE AP), the random-access trigger frame comprising a resource unit for random access; configure the HE station to transmit a response to the HE AP in accordance with the resource unit for random access; and decode a multi-station block acknowledgement (BlockAck) to the response, where if the HE station is unassociated with the HE AP the multi-station BlockAck comprises an indication that a portion of the multi-station BlockAck is for an unassociated station, and where the portion of the multi-station BlockAck comprises a media access control (MAC) address of the HE station, where the MAC address of the HE station indicates that the portion of the multi-station BlockAck is for the HE station.

In Example 23, the subject matter of Example 22 optionally includes where the processing circuitry is further configured to: decode the multi-station BlockAck to the response, where if the HE station is associated with the HE AP, the portion of the multi-station BlockAck comprises an association identification (AID) of the FIE station, where the AID indicates that the portion of the multi-station BlockAck is for the HE station.

In Example 24, the subject matter of any one or more of Examples 22-23 optionally include where the indication the multi-station BlockAck is for the unassociated station comprises an association identification (AID) field with a unique identification (UID) value, an acknowledgment type field with a value of zero, and a traffic indication (TID) field with a value of fifteen.

In Example 25, the subject matter of any one or more of Examples 22-24 optionally include transceiver circuitry coupled to the processing circuitry; and, one or more antennas coupled to the transceiver circuitry.

Example 26 is an apparatus of a high-efficiency (HE) access point, the apparatus comprising: means for decoding responses to a random-access trigger frame, where one of the responses is a response from an unassociated station; means for encoding an acknowledgement to acknowledge receipt of the response from the unassociated station, where the acknowledgement comprises an indication that the acknowledgement is for the unassociated station, and where the acknowledgement further comprises a media access control (MAC) address of the unassociated station in a field of the acknowledgement other than a field in a MAC header portion of the acknowledgement; and means for configuring the HE access point to transmit the acknowledgement.

In Example 27, the subject matter of Example 26 optionally includes where the apparatus further comprises: means for determining the MAC address of the unassociated station from a transmitter address field of the response from the unassociated station.

In Example 28, the subject matter of any one or more of Examples 26-27 optionally include where the indication comprises an association identification (AID) field with a unique identification (UID) value, an acknowledgment type field with a value of zero, and a traffic indication (TID) field with a predetermined value.

In Example 29, the subject matter of Example 28 optionally includes where the UID value is a number from zero to two-thousand and forty-seven.

In Example 30, the subject matter of any one or more of Examples 28-29 optionally include where the UID value is 2045.

In Example 31, the subject matter of any one or More of Examples 26-30 optionally include the apparatus further comprising: means for encoding the random-access trigger frame to comprise indications of resource units for random access, where the unassociated station response is received on one of the resource units assigned for random access.

In Example 32, the subject matter of any one or more of Examples 26-31 optionally include where the response from the unassociated station is one from the following group: a MAC protocol data unit (MPDU), a management MPDU (MMPDU), an aggregated-MPDU (A-MPDU), physical (PHY) Layer Convergence Procedure (PLCP) (PPDU), a MAC service data unit (MSDU), and an aggregated (A-MSDU).

In Example 33, the subject matter of any one or more of Examples 26-32 optionally include where the acknowledgement is a multi-station block acknowledgement (BlockAck) frame, and where the indication that the acknowledgment is for the unassociated station and the MAC address of the unassociated station indicate that a portion of the multi-station BlockAck is for the unassociated HE station.

In Example 34, the subject matter of Example 33 optionally includes where a value of a BlockAck bitmap field of the multi-station BlockAck frame is encoded with the MAC address of the unassociated station.

In Example 35, the subject matter of any one or more of Examples 26-34 optionally include the apparatus further comprising: means for decoding responses to the random-access trigger frame, where responses from lower-power stations are decoded on channel bandwidths that are less than 20 MHz.

In Example 36, the subject matter of any one or more of Examples 26-35 optionally include access point.

In Example 37, the subject matter of any one or more of Examples 26-36 optionally include where one of the responses is a response from an associated station, and where the apparatus further comprises: means for decoding responses to the random-access trigger frame, where a second response is a response from an associated station; and means for encoding the acknowledgement to acknowledge the response from the associated station, where the acknowledgement comprises an association identification (AID) of the associated station to indicate a portion of the acknowledgment that is for the associated station.

In Example 38, the subject matter of Example 37 optionally includes where the apparatus further comprises: means for encoding the random-access trigger frame to comprise indications of resource units for random access, where the associated station response is received on one of the resource units assigned for random access.

In Example 39, the subject matter of Example 38 optionally includes where the apparatus further comprises: means for determining the AID of the associated station from a MAC address of the second response from the associated station.

In Example 40, the subject matter of any one or more of Examples 26-39 optionally include where the apparatus further comprises: means for processing radio-frequency signals coupled to means for processing information; and, means for receiving and transmitting radio-frequency signals coupled to the means for processing the radio-frequency signals.

In Example 41, the subject matter of any one or more of Examples 26-40 optionally include the apparatus further comprising means for storing and retrieving information coupled to the means for processing information.

Example 42 is a non-transitory computer-readable storage medium that stores instructions for execution by one or more processors, the instructions to configure the one or more processors to cause a high-efficiency (HE) station to: decode a random-access trigger frame from a HE access point (HE AP), the random-access trigger frame comprising a resource unit for random access; configure the HE station to transmit a response to the HE AP in accordance with the resource unit for random access; and decode a multi-station block acknowledgement (BlockAck) to the response, where if the HE station is unassociated with the HE AP, the multi-station BlockAck comprises an indication that a portion of the multi-station BlockAck is for an unassociated station, and where the portion of the multi-station BlockAck comprises a media access control (MAC) address of the HE station, where the MAC address of the HE station indicates that the portion of the multi-station BlockAck is for the HE station.

In Example 43, the subject matter of Example 42 optionally includes where the instructions further configure the one or more processors to cause the HE station to: decode the multi-station BlockAck to the response, where if the HE station is associated with the HE AP, the portion of the multi-station BlockAck comprises an association identification (AID) of the HE station, where the AID indicates that the portion of the multi-station BlockAck is for the HE station.

In Example 44, the subject matter of any one or more of Examples 42-43 optionally include where the indication the multi-station BlockAck is for the unassociated station comprises an association identification (AID) field with a unique identification (UID) value, an acknowledgment type field with a value of zero, and a traffic indication (TID) field with a value of fifteen.

Example 45 is a method performed by a high-efficiency (HE) station, the method comprising: decoding a random-access trigger frame from a HE access point (HE AP), the random-access trigger frame comprising a resource unit for random access; configuring the HE station to transmit a response to the HE AP in accordance with the resource unit for random access; and decoding a multi-station block acknowledgement (BlockAck) to the response, where if the HE station is unassociated with the HE AP, the multi-station BlockAck comprises an indication that a portion of the multi-station BlockAck is for an unassociated station, and where the portion of the multi-station BlockAck comprises a media access control (MAC) address of the HE station, where the MAC address of the HE station indicates that the portion of the multi-station BlockAck is for the HE station.

In Example 46, the subject matter of Example 45 optionally includes where the method further comprises: decoding the multi-station BlockAck to the response, where if the HE station is associated with the HE AP, the portion of the multi-station BlockAck comprises an association identification (AID) of the HE station, where the AID indicates that the portion of the multi-station BlockAck is for the HE station.

In Example 47, the subject matter of any one or more of Examples 45-46 optionally include where the indication the multi-station BlockAck is for the unassociated station comprises an association identification (AID) field with a unique identification (UID) value, an acknowledgment type field with a value of zero, and a traffic indication (TID) field with a value of fifteen.

Example 48 is an apparatus of a high-efficiency (HE) station, the apparatus comprising: means for decoding a random-access trigger frame from a HE access point (HE AP), the random-access trigger frame comprising a resource unit for random access; means for configuring the HE station to transmit a response to the HE AP in accordance with the resource unit for random access; and means for decoding a multi-station block acknowledgement (BlockAck) to the response, where if the HE station is unassociated with the HE AP, the multi-station BlockAck comprises an indication that a portion of the multi-station BlockAck is for an unassociated station, and where the portion of the multi-station BlockAck comprises a media access control (MAC) address of the HE station, where the MAC address of the HE station indicates that the portion of the multi-station BlockAck is for the HE station.

In Example 49, the subject matter of Example 48 optionally includes were the apparatus further comprises: means for decoding the multi-station BlockAck to the response, where if the HE station is associated with the HE AP, the portion of the multi-station BlockAck comprises an association identification (AID) of the HE station, where the AID indicates that the portion of the multi-station BlockAck is for the HE station.

In Example 50, the subject matter of any one or more of Examples 48-49 optionally include where the indication the multi-station BlockAck is for the unassociated station comprises an association identification (AID) field with a unique identification (UID) value, an acknowledgment type field with a value of zero, and a traffic indication (TID) field with a value of fifteen.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high efficiency (HE) station (STA), the apparatus comprising: memory; processing circuitry coupled to the memory; mixer circuitry coupled to the memory, the mixer circuitry to downconvert radio frequency (RF) signals to baseband signals; and synthesizer circuitry, the synthesizer circuitry comprising one of a fractional-N synthesizer or a fractional N/N+1 synthesizer, the synthesizer circuitry configured to generate an output frequency for use by the mixer circuitry, the processing circuitry configured to:

decode the baseband signals, the baseband signals comprising a trigger frame from a HE access point (AP), the trigger frame comprising an indication of a random access (RA) resource unit (RU) (RA-RU) available for STAs not associated with the HE AP, wherein the HE STA is not associated with the HE AP;

configure the HE station to transmit a HE trigger based (TB) physical layer (PHY) protocol data unit (PPDU) (HE TB PPDU) to the HE AP in accordance with the RA-RU; and decode a multi-station block acknowledgement (BlockAck) frame from the HE AP, the multi-station BlockAck frame comprising a block acknowledgement (BA) information field, the BA information field comprising an association identification (AID) subfield, the AID subfield indicating a first predetermined value, the first predetermined value indicating an identifier for an unassociated STA, an acknowledgement (ACK) type subfield, the ACK type subfield indicating a second predetermined value, a traffic identification (TID) subfield, the TID subfield indicating a third predetermined value, and a subfield for a media access control (MAC) address, the subfield indicating a media access control (MAC) address of the HE STA, the MAC address indicating the BA information field is for the HE STA and indicating that the multi-station BlockAck frame acknowledges the HE TB PPDU.

2. The apparatus of claim 1, wherein before configuring the HE STA to transmit the TB PPDU, the processing circuitry is further configured to:

encode the HE TB PPDU to comprise a single (S) medium access control (MAC) protocol data unit (MPDU)(S-MPDU).

3. The apparatus of claim 2, wherein the S-MDPU includes one management frame.

4. The apparatus of claim 1, wherein the BA information field comprises a per TID info subfield.

5. The apparatus of claim 1, wherein the trigger frame is a trigger frame for random access.

6. The apparatus of claim 1, wherein the first predetermined value is 2045, the second predetermined value is 15, and the third predetermined value is 0.

7. The apparatus of claim 6, wherein the multi-station BlockAck frame further comprises another AID subfield, the another AID subfield indicating a value different from 2045, the value different from 2045 indicating a value of another HE STA, the another HE STA being associated with the HE AP.

8. The apparatus of claim 1, wherein the processing circuitry is configured to:

configure the HE station to transmit the HE TB PPDU to the HE AP in accordance with the RA-RU and short interframe space (SIFS) after receiving the trigger frame.

9. The apparatus of claim 1, wherein the trigger frame further comprises a modulation and coding scheme (MCS), and wherein the processing circuitry is configured to:

before the configure the HE station, encode the HE TB PPDU in accordance with the MCS.

10. The apparatus of claim 1, wherein the BA information field comprises a plurality of per TID info subfields, and wherein per TID info subfields of the plurality of per TID info subfields with AID subfields indicating the value of 2045 have a first format and per TID info subfields of the plurality of per TID info subfields with AID subfields indicating a value different from 2045 have a second format.

11. The apparatus of claim 1, wherein the BA information field comprises a per TID info subfield that indicates an acknowledgement of the HE TB PPDU, and wherein the per TID info subfield comprises the AID subfield, the ACK type subfield, and the TID subfield.

12. The apparatus of claim 1, wherein the HE STA is configured for uplink (U) orthogonal frequency division multiple-access (O) based random access (RA) (UORA).

13. The apparatus of claim 1, further comprising: transceiver circuitry coupled to the processing circuitry; and, one or more antennas coupled to the transceiver circuitry, and wherein the memory is configured to store the multi-station BlockAck frame.

14. An apparatus of a high efficiency (HE) access point (AP), the apparatus comprising: memory; processing circuitry couple to the memory; mixer circuitry coupled to the memory, the mixer circuitry to down-convert RF signals to baseband signals; and synthesizer circuitry, the synthesizer circuitry comprising a delta-sigma synthesizer, the synthesizer circuitry configured to generate an output frequency for use by the mixer circuitry, the processing circuitry configured to:

encode a trigger frame for HE stations (STAs), the trigger frame comprising a random access (RA) resource unit (RU) (RA-RU) available for STAs not associated with the HE AP;

configure the HE AP to transmit the trigger frame to the HE STAs;

decode the baseband signals, the baseband signals comprising a HE trigger based (TB) physical layer (PHY) protocol data unit (PPDU) (HE TB PPDU) from an HE STA of the HE STAs in accordance with the RA-RU, wherein the HE STA is not associated with the HE AP; and encode for transmission a multi-station block acknowledgement (BlockAck) frame to the HE STA, the multi-station BlockAck frame comprising a per traffic identification (TID) information (info) subfield, the per TID info subfield comprising an association identification (AID) subfield, the AID subfield indicating a value of 2045, the value of 2045 indicating an identifier for an unassociated STA, an ACK type subfield, the ACK type subfield indicating a value of 0, and a TID subfield, the TID subfield indicating a value of 15, and a subfield, the subfield indicating a media access control (MAC) address of the HE STA, the MAC address indicating the per TID info subfield is for the HE STA.

15. The apparatus of claim 14, wherein the processing circuitry is further configured to:

encode the multi-station BlockAck frame to further comprises another per TID info subfield, the another per TID info subfield comprising another AID subfield, the another AID subfield indicating a value different from 2045, the value different from 2045 indicating a value of a AID of another HE STA, the another HE STA being associated with the HE AP.

16. The apparatus of claim 14, further comprising: transceiver circuitry coupled to the processing circuitry; and, one or more antennas coupled to the transceiver circuitry, and wherein the memory is configured to store the trigger frame.

17. An apparatus of a high efficiency (HE) station (STA), the apparatus comprising: memory; processing circuitry coupled to the memory; mixer circuitry coupled to the memory, the mixer circuitry to down-convert RF signals to baseband signals; and synthesizer circuitry, the synthesizer circuitry comprising a delta-sigma synthesizer, the synthesizer circuitry configured to generate an output frequency for use by the mixer circuitry, the processing circuitry configured to:
  decode the baseband signals, the baseband signals comprising a trigger frame from a HE access point (AP), the trigger frame comprising an indication of a random access (RA) resource unit (RU) (RA-RU) available for STAs not associated with the HE AP, wherein the HE STA is not associated with the HE AP;
  configure the HE station to transmit a HE trigger based (TB) physical layer (PHY) protocol data unit (PPDU) (HE TB PPDU) to the HE AP in accordance with the RA-RU; and
  decode a multi-station block acknowledgement (BlockAck) frame from the HE AP, the multi-station Block-Ack frame comprising a block acknowledgement (BA) information field, the BA information field comprising an association identification (AID) subfield, the AID subfield indicating a first predetermined value, the first predetermined value indicating an identifier for an unassociated STA, an acknowledgement (ACK) type subfield, the ACK type subfield indicating a second predetermined value, and a traffic identification (TID) subfield, the TID subfield indicating a third predetermined value, and a subfield, the subfield indicating a media access control (MAC) address of the HE STA, the MAC address indicating the BA information field is for the HE STA and indicating that the multi-station BlockAck frame acknowledges the HE TB PPDU.

18. The apparatus of claim 17, wherein before configuring the HE STA to transmit the TB PPDU, the processing circuitry is further configured to:
  encode the HE TB PPDU to comprise a single (S) medium access control (MAC) protocol data unit (MPDU)(S-MPDU).

19. The apparatus of claim 18, wherein the S-MDPU includes one management frame.

20. The apparatus of claim 17, wherein the multi-station BlockAck frame comprises a block acknowledgement (BA) information field, and the BA information field comprises a per TID info subfield, the per TID info subfield comprising the AID subfield, the ACK type subfield, the TID subfield, and the RA subfield.

21. The apparatus of claim 17, wherein the trigger frame is a trigger frame for random access.

22. The apparatus of claim 17, wherein the first predetermined value is 2045, the second predetermined value is 15, and the third predetermined value is 0.

23. An apparatus of a high efficiency (HE) access point (AP), the apparatus comprising: memory; processing circuitry couple to the memory; mixer circuitry coupled to the memory, the mixer circuitry to downconvert radio frequency (RF) signals to baseband signals; and synthesizer circuitry, the synthesizer circuitry comprising one of a fractional-N synthesizer or a fractional N/N+1 synthesizer, the synthesizer circuitry configured to generate an output frequency for use by the mixer circuitry, the processing circuitry configured to:
  encode a trigger frame for HE stations (STAs), the trigger frame comprising a random access (RA) resource unit (RU) (RA-RU) available for STAs not associated with the HE AP;
  configure the HE AP to transmit the trigger frame to the HE STAs;
  decode the baseband signals, the baseband signals comprising a HE trigger based (TB) physical layer (PHY) protocol data unit (PPDU) (HE TB PPDU) from an HE STA of the HE STAs in accordance with the RA-RU, wherein the HE STA is not associated with the HE AP; and
  encode for transmission a multi-station block acknowledgement (BlockAck) frame to the HE STA, the multi-station BlockAck frame comprising a per traffic identification (TID) information (info) subfield, the per TID info subfield comprising an association identification (AID) subfield, the AID subfield indicating a value of 2045, the value of 2045 indicating an identifier for an unassociated STA, an ACK type subfield, the ACK type subfield indicating a value of 0, and a TID subfield, the TID subfield indicating a value of 15, and a subfield, the subfield indicating a media access control (MAC) of the HE STA, the MAC address indicating the per TID info subfield is for the HE STA.

24. The apparatus of claim 23, wherein the processing circuitry is further configured to:
  encode the multi-station BlockAck frame to further comprises another per TID info subfield, the another per TID info subfield comprising another AID subfield, the another AID subfield indicating a value different from 2045, the value different from 2045 indicating a value of a AID of another HE STA, the another HE STA being associated with the HE AP.

25. The apparatus of claim 23, further comprising: transceiver circuitry coupled to the processing circuitry; and, one or more antennas coupled to the transceiver circuitry, and
  wherein the memory is configured to store the trigger frame.

* * * * *